(12) United States Patent
Park

(10) Patent No.: US 9,680,590 B2
(45) Date of Patent: *Jun. 13, 2017

(54) METHOD AND APPARATUS FOR TRANSMITTING AND RECEIVING SIGNALS IN WIRELESS COMMUNICATION SYSTEM

(71) Applicant: GOLDPEAK INNOVATIONS INC, Seoul (KR)

(72) Inventor: Dong Hyun Park, Seoul (KR)

(73) Assignee: GOLDPEAK INNNOVATIONS INC, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/222,068

(22) Filed: Jul. 28, 2016

(65) Prior Publication Data

US 2016/0337064 A1    Nov. 17, 2016

Related U.S. Application Data

(63) Continuation of application No. 14/147,295, filed on Jan. 3, 2014, now Pat. No. 9,419,739, which is a
(Continued)

(30) Foreign Application Priority Data

Dec. 21, 2010   (KR) ........................ 10-2010-0131864

(51) Int. Cl.
*H04W 52/04* (2009.01)
*H04J 3/16* (2006.01)
(Continued)

(52) U.S. Cl.
CPC .......... *H04J 3/1694* (2013.01); *H04L 1/1692* (2013.01); *H04L 1/1861* (2013.01);
(Continued)

(58) Field of Classification Search
None
See application file for complete search history.

(56) References Cited

U.S. PATENT DOCUMENTS 7,006,482 B1   2/2006 Choi et al.
8,830,883 B2   9/2014 Chen et al.
(Continued)

FOREIGN PATENT DOCUMENTS

CN    1390402     1/2003
CN    101588224   11/2009
(Continued)

OTHER PUBLICATIONS

3GPP. "3rd Generation Partnership Project; Technical Specification Group Radio Access Network; Evolved Universal Terrestrial Radio Access (E-UTRA); Physical layer procedures (Release 9)," 3GPP TS 36.213 V9.2.0, Jun. 2010.
(Continued)

*Primary Examiner* — Alex Skripnikov

(57) ABSTRACT

An apparatus and a method for allocating resources for transmitting an HARQ ACK/NACK signal for a downlink subframe using a PUCCH format 3 in a time division duplex (TDD) system using a single carrier are provided. Since the resources are allocated through a resource indicator transmitted using a power control field transmitted on a PDCCH of the downlink subframe, the resources for transmitting the HARQ ACK/NACK signal may be allocated by effectively using resources allocated to a duplicately transferred control signal.

10 Claims, 20 Drawing Sheets

ARI     TPC

Related U.S. Application Data continuation of application No. 13/332,089, filed on Dec. 20, 2011, now Pat. No. 8,649,346.

(51) Int. Cl.

| | | |
|---|---|---|
| *H04L 1/16* | (2006.01) | |
| *H04W 52/14* | (2009.01) | |
| *H04W 52/32* | (2009.01) | |
| *H04W 52/54* | (2009.01) | |
| *H04L 5/00* | (2006.01) | |
| *H04W 72/04* | (2009.01) | |
| *H04L 1/00* | (2006.01) | |
| *H04L 1/18* | (2006.01) | |

(52) U.S. Cl.
CPC ......... *H04L 5/0055* (2013.01); *H04W 52/146* (2013.01); *H04W 52/325* (2013.01); *H04W 52/54* (2013.01); *H04W 72/042* (2013.01); *H04W 72/0413* (2013.01); *H04L 1/0026* (2013.01); *H04L 1/1812* (2013.01)

(56) References Cited

U.S. PATENT DOCUMENTS

| | | |
|---|---|---|
| 8,923,273 B2 | 12/2014 | Seo et al. |
| 2009/0046667 A1 | 2/2009 | Pelletier et al. |
| 2011/0243066 A1 | 10/2011 | Nayeb Nazar et al. |
| 2011/0274064 A1 | 11/2011 | Luo et al. |
| 2012/0044894 A1 | 2/2012 | Ko et al. |
| 2012/0093104 A1 | 4/2012 | Tiirola et al. |
| 2012/0127938 A1 | 5/2012 | Lv et al. |
| 2012/0236767 A1 | 9/2012 | Zhu et al. |
| 2012/0294204 A1 | 11/2012 | Chen et al. |
| 2013/0039296 A1 | 2/2013 | Damnjanovic et al. |
| 2013/0083741 A1 | 4/2013 | Larsson et al. |

FOREIGN PATENT DOCUMENTS

| | | |
|---|---|---|
| JP | 2010-537503 | 12/2010 |
| JP | 2011-517191 | 5/2011 |
| JP | 2011-520335 | 7/2011 |
| JP | 2013-507067 | 2/2013 |
| JP | 2013-540394 | 10/2013 |
| WO | 2009/129698 | 10/2009 |
| WO | 2009/154839 | 12/2009 |
| WO | 2010/106786 | 9/2010 |
| WO | 2012/068141 | 5/2012 |

OTHER PUBLICATIONS

3GPP. "3rd Generation Partnership Project; Technical Specification Group Radio Access Network; Evolved Universal Terrestriai Radio Access (E-UTRA); Muitipiexing and channel coding (Reiease 9)," 3GPP TS 36.212 V9.2.0, Jun. 2010.

International Search Report issued for related International Application No. PCT/KR2011/009882 dated May 30, 2012.

Notice of Allowance issued in U.S. Appl. No. 13/332,089 dated Oct. 7, 2013.

Ex parte Quayle Office Action issued in U.S. Appl. No. 13/332,089 dated Jul. 12, 2013.

LG Electronics, ACK/NACK on PUCCH for TDD, 3GPP TSG-RAN WG1 #63, R1-106099, Nov. 15-19, 2010, pp. 1-14, Jacksonville, USA.

Catt et al., Way forward on TDD ACK/NACK in Rel-10, TSG-RAN WG1 #63, R1-106495, Nov. 15-19, 2010, Jacksonville, USA.

Pantech, Usage of PUCCH format 3 in Non-CA environment for TDD, 3GPP, TSG-RAN1 #63bis, R1-110157, Jan. 17-21, 2011, Dublin, Ireland.

European Search Report issued on Nov. 6, 2015, in European Patent Application No. 11850274.9.

Pantech, "PUCCH Resource Allocation with SORTD For Channel Selection", 3GPP TSG RAN1 #63, R1-106054, Jacksonville, USA, Nov. 15-Nov. 19, 2010.

Huawei, et al, "ACK/NACK Feedback with Channel Selection for TDD", 3GPP TSG RAN WG1 Meeting #63, R1-106152, Jacksonville, Florida, USA, Nov. 15-19, 2010.

Huawei, et al., "Way Forward on A/N PUCCH Resource Allocation", TSG-RAN W1 Meeting #62bis, Xi'an, P.R. China, R1-105777, Oct. 11-15, 2010.

Catt, "Remaining issues on TDD ACK/NACK in Rel-10", 3GGP TSG RAN WG1 Meeting #63, Nov. 15-19, 2010, R1-105909, Jacksonville, USA.

Non-Final Office Action issued on Jul. 23, 2015 for U.S. Appl. No. 14/147,295.

Final Office Action issued Feb. 2, 2016 for U.S. Appl. No. 14/147,295.

Notice of Allowance issued in U.S. Appl. No. 14/147,295 dated Apr. 12, 2016.

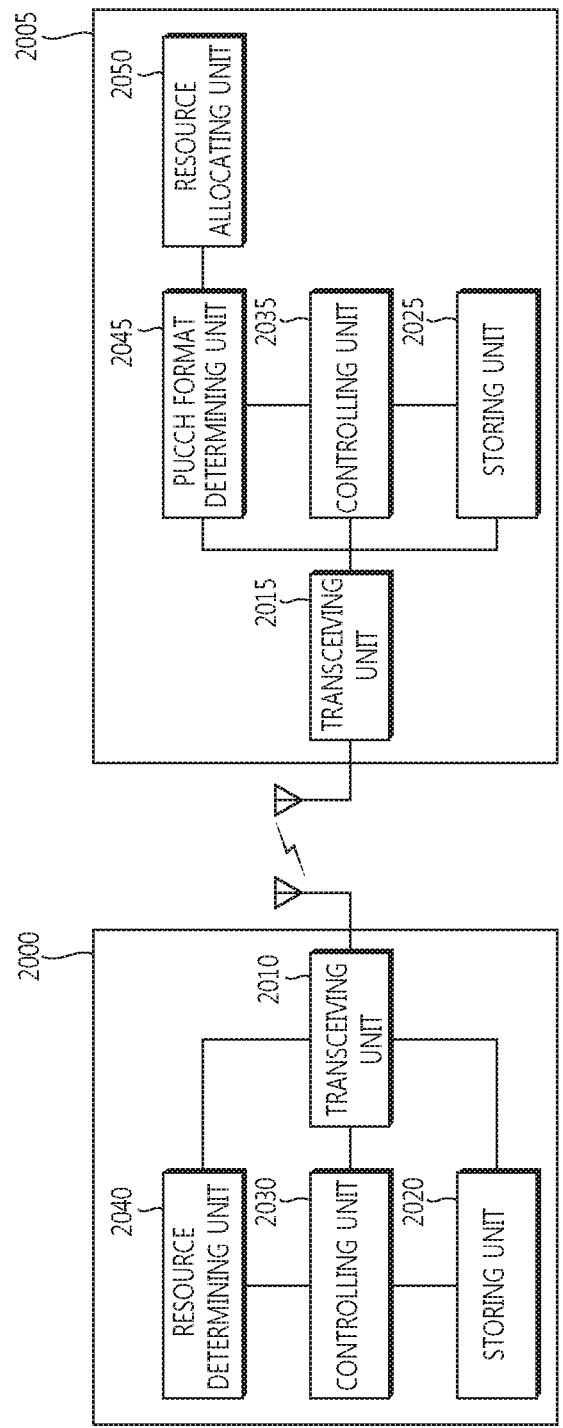

METHOD AND APPARATUS FOR TRANSMITTING AND RECEIVING SIGNALS IN WIRELESS COMMUNICATION SYSTEM

CROSS-REFERENCE TO RELATED APPLICATIONS

This application is a continuation of U.S. patent application Ser. No. 14/147,295, filed on Jan. 3, 2014, which is a continuation of U.S. patent application Ser. No. 13/332,089, filed on Dec. 20, 2011, now issued as U.S. Pat. No. 8,649,346, and claims the benefit of priority of Korean Patent Application No. 10-2010-0131864 filed on Dec. 21, 2010, all of which are incorporated by reference in their entirety herein.

BACKGROUND OF THE INVENTION

Field of the Invention

The present invention relates to wireless communication, and more particularly, to a wireless communication system supporting multiple carriers.

Related Art

A wireless communication system generally uses a single bandwidth in order to transmit data. For example, the second-generation wireless communication system uses a bandwidth 200 KHz to 1.25 MHz and the third-generation wireless communication system uses a bandwidth of 5 MHz to 10 MHz. In order to support increasing transmission capacity, in the LTE (long term evolution) or the IEEE 802.16m of the recent 3rd generation partnership project (3GPP), a bandwidth has been continuously extended up to 20 MHz or more. It is necessary to increase a bandwidth in order to increase transmission capacity. However, it is not easy to allocate a frequency having a large bandwidth except some areas around the world.

As a technology for efficiently using a segmented small band, a carrier aggregation (CA) technology for generating an effect such as using a logical large band by bundling a plurality of physically non-continuous bands in a frequency domain has been developed. An individual unit carrier bundled by the carrier aggregation is referred to as component carrier (CC). Each component carrier is defined by a single bandwidth and a center frequency.

A system capable of transmitting and/or receiving data in a wide band through a plurality of component carriers is referred to as a multiple component carrier system or a carrier aggregation environment. The multiple component carrier system simultaneously supports a narrow band and a wide band by using one or more carrier. For example, when the single carrier corresponds to a bandwidth of 5 MHz, the multiple component carrier system may support a bandwidth of maximum 20 MHz by using four carriers.

In order to operate the multiple component carrier system, various control signaling is required between a base station and a user equipment. For example, exchange of acknowledgement (ACK)/not-acknowledgement (NACK) information for performing hybrid automatic repeat request (HARD), exchange of a channel quality indicator (CQI) indicating quality of a downlink channel, and the like, are required.

SUMMARY OF THE INVENTION

The present invention provides a method for effectively allocating transmission resources for transmitting an ACK/NACK signal for a single carrier in a time division duplex (TDD) single carrier system.

The present invention also provides a method for effectively using wireless resources by diverting resources allocated to a duplicately transferred control signal in a TDD single carrier system.

In an aspect, a method for allocating a HARQ ACK/NACK resource of a base station in a time division duplex (TDD) system using a single carrier is provided. The method includes: determining a format for a control channel of an uplink subframe associated with a transmitted downlink subframe; and transmitting a resource indicator allocating the resources using a power control field transmitted on a control channel of the downlink subframe when it is determined that the format for the control channel of the uplink subframe is a control channel format to which discrete Fourier transform-spreading orthogonal frequency division multiplexing (DFT-S-OFDM) is applied, wherein a resource indicated by the resource indicator on a resource mapping table configured of resources of a control channel format to which the DFT-S-OFDM is applied is allocated as a resource for transmitting the HARQ ACK/NACK signal through the control channel of the uplink subframe when it is determined that the format for the control channel of the uplink subframe is the control channel format to which the DFT-S-OFDM is applied, and the resource for transmitting the HARQ ACK/NACK signal is allocated through the control channel of the uplink subframe based on a control channel component index for the downlink control channel without transmitting the resource indicator when it is determined that the format for the control channel of the uplink subframe is a format different from the control channel format to which the DFT-S-OFDM is applied.

In another aspect, a method for transmitting a HARQ ACK/NACK signal of a user equipment in a TDD system using a single carrier is provided. The method includes: judging whether a transmitted resource indicator is present using a power control field transmitted on a control channel of a received downlink subframe; and transmitting a HARQ ACK/NACK signal for the downlink subframe on a control channel of an uplink subframe with which the downlink subframe is associated using a resource indicated by the resource indicator on a resource mapping table configured of resources of a control channel format to which DFT-S-OFDM is applied when the resource indicator is present and transmitting the HARQ ACK/NACK signal for the downlink subframe on the control channel of the uplink subframe using a resource allocated based on a control channel component index for the downlink control channel when the resource indicator is not present.

In still another aspect, a base station for allocating a HARQ ACK/NACK resource in a TDD system using a single carrier is provided. The base station includes: a transceiving unit transceiving necessary information; a format determining unit determining a format for a control channel of an uplink subframe; and a resource allocating unit allocating a HARQ ACK/NACK resource for transmitting HARQ ACK/NACK on the control channel the uplink subframe, wherein the format determining unit determines whether the format for the control channel of the uplink subframe is a control channel format to which DFT-S-OFDM is applied, the resource allocating unit configures a resource indicator indicating a resource on a mapping table configured of resources of a control channel format to which the DFT-S-OFDM is applied to allow the resource indicated by the resource indicator to be allocated as the HARQ ACK/NACK resource when the format determining unit determines that the format for the control channel of the uplink subframe is the control channel format to which the DFT-S-OFDM is applied and allows the HARQ ACK/NACK resource to be allocated based on a control channel component index for a control channel of a downlink subframe corresponding to the uplink subframe when the format determining unit determines that the format for the control channel of the uplink subframe is a format different from the control channel format to which the DFT-S-OFDM is applied, and the resource indicator is transmitted using a power control field transmitted on the control channel of the downlink subframe.

In still another aspect, a method for transmitting control information of a base station in a TDD system using a single carrier is provided. The method includes: setting a transmit power control (TPC) command for controlling physical uplink control channel (PUCCH) transmission power and acknowledgement (ACK)/not-acknowledgement (NACK) resource indicating information indicating resources for transmitting a hybrid automatic repeat request (HARQ) ACK/NACK signal on the PUCCH, in an uplink (UL) subframe; and transmitting at least one of the TPC command and the ACK/NACK resource indicating information on a physical downlink control channel (PDCCH) in downlink (DL) subframes corresponding to the UL subframe, wherein a HARQ ACK/NACK signal for the DL subframes corresponding to the UL subframe is transmitted on the PUCCH using a PUCCH format 3, the TPC command is transmitted on the PDCCH in at least one of the DL subframes corresponding to the UL subframe, and the ACK/NACK resource indicating information is transmitted using bits allocated in order to transmit the TPC command on the PDCCH in DL subframes in which the TPC command is not transmitted among the DL subframes corresponding to with the UL subframe.

The ACK/NACK resource indicating information may indicate a resource to be used for transmitting the HARQ ACK/NACK signal among allocated resources by higher layer signaling.

The ACK/NACK resource indicating information transmitted in the DL subframes corresponding to the UL subframe may be set to indicate the same resource.

When the number of DL subframes corresponding to the UL subframe is one, the HARQ ACK/NACK signal for the DL subframes corresponding to the UL subframe may be transmitted on the PUCCH using PUCCH formats 1a/1b.

In still another aspect, a method for transmitting a HARQ ACK/NACK signal of a user equipment in a TDD system using a single carrier is provided. The method includes: receiving a TPC command for controlling PUCCH transmission power and ACK/NACK resource indicating information indicating resources for transmitting a HARQ ACK/NACK signal on the PUCCH; and transmitting the PUCCH based on the TPC command and the ACK/NACK resource indicating information, wherein at least one of the TPC command and the ACK/NACK resource indicating information is received in DL subframes corresponding to a UL subframe in which the PUCCH is transmitted, the TPC command is received on a PDCCH in at least one of the DL subframes corresponding to the UL subframe, the ACK/NACK resource indicating information is received using bits allocated in order to transmit the TPC command in DL subframes in which the TPC command is not transmitted among the DL subframes corresponding to the UL subframe, and in the transmitting of the PUCCH, a HARQ ACK/NACK signal for the DL subframes corresponding to the UL subframe is transmitted on the PUCCH using a PUCCH format 3.

The user equipment may use a resource indicated by the ACK/NACK resource indicating information in a allocated resource set by higher layer signaling in order to transmit the HARQ ACK/NACK signal.

The ACK/NACK resource indicating information transmitted in the DL subframes corresponding to the UL subframe may indicate the same resource.

When the number of DL subframes corresponding to the UL subframe is one, in the transmitting of the PUCCH, the HARQ ACK/NACK signal for the DL subframes corresponding to the UL subframe may be transmitted on the PUCCH using PUCCH formats 1a/1b.

In still another aspect, an apparatus for transmitting control information in a TDD system using a single carrier is provided. The apparatus includes: a format determining unit determining a PUCCH format of a UL subframe; a transceiving unit performing transmission on a PDCCH in DL subframes corresponding to the UL subframe; a resource allocating unit setting ACK/NACK resource indicating information indicating resources for transmitting a HARQ ACK/NACK signal on the PUCCH; and a controlling unit transmitting at least one of a TPC command for controlling PUCCH transmission power and the ACK/NACK resource indicating information in the UL subframe through the transceiving unit, wherein a HARQ ACK/NACK signal for the DL subframes corresponding to the UL subframe is received on the PUCCH in the UL subframe using a PUCCH format determined by the format determining unit, the controlling unit transmits the TPC command on the PDCCH in at least one of the DL subframes corresponding to the UL subframe and transmits the ACK/NACK resource indicating information using bits allocated in order to transmit the TPC command on the PDCCH in DL subframes in which the TPC command is not transmitted among the DL subframes corresponding to the UL subframe, and the format determining unit determines that the PUCCH format is a PUCCH format 3 when at least two DL subframes correspond to the UL subframe.

The format determining unit may determine that the PUCCH format is PUCCH formats 1a/1b when only a single DL subframe corresponds to the UL subframe.

The resource allocating unit may set the ACK/NACK resource indicating information transmitted in the DL subframes corresponding to the UL subframe so as to indicate the same resource.

In still another aspect, an apparatus for transmitting a HARQ ACK/NACK signal in a TDD system using a single carrier is provided. The apparatus includes: a transceiving unit transceiving information; a resource determining unit determining resources used to transmit a HARQ ACK/NACK signal for DL subframes corresponding to a UL subframe on a PUCCH in the UL subframe; and a controlling unit controlling transmission of the UL subframe, wherein the transceiving unit receives a TPC command on a PDCCH in at least one of the DL subframes corresponding to the UL subframe and receives the ACK/NACK resource indicating information transmitted using bits allocated in order to transmit the TPC command on the PDCCH in DL subframes in which the TPC command is not transmitted among the DL subframes corresponding to the UL subframe, the controlling unit controls transmission power of the PUCCH based on the TPC command, the resource determining unit determines that a resource indicated by the ACK/NACK resource indicating information is a resource used to transmit the HARQ ACK/NACK signal, and the ACK/NACK resource indicating information indicates a resource of a PUCCH format 3 when the number of DL subframes corresponding to the UL subframe is two or more.

The ACK/NACK resource indicating information may indicate a resource of PUCCH formats 1a/1b when the number of DL subframes corresponding to the UL subframe is one.

The ACK/NACK resource indicating information received in the DL subframes corresponding to the UL subframe may indicate the same resource.

BRIEF DESCRIPTION OF THE DRAWINGS

FIG. 20 is a block diagram schematically showing an example of configurations of a base station and a user equipment in a system according to the exemplary embodiment of the present invention.

DESCRIPTION OF EXEMPLARY EMBODIMENTS

Figure 1:
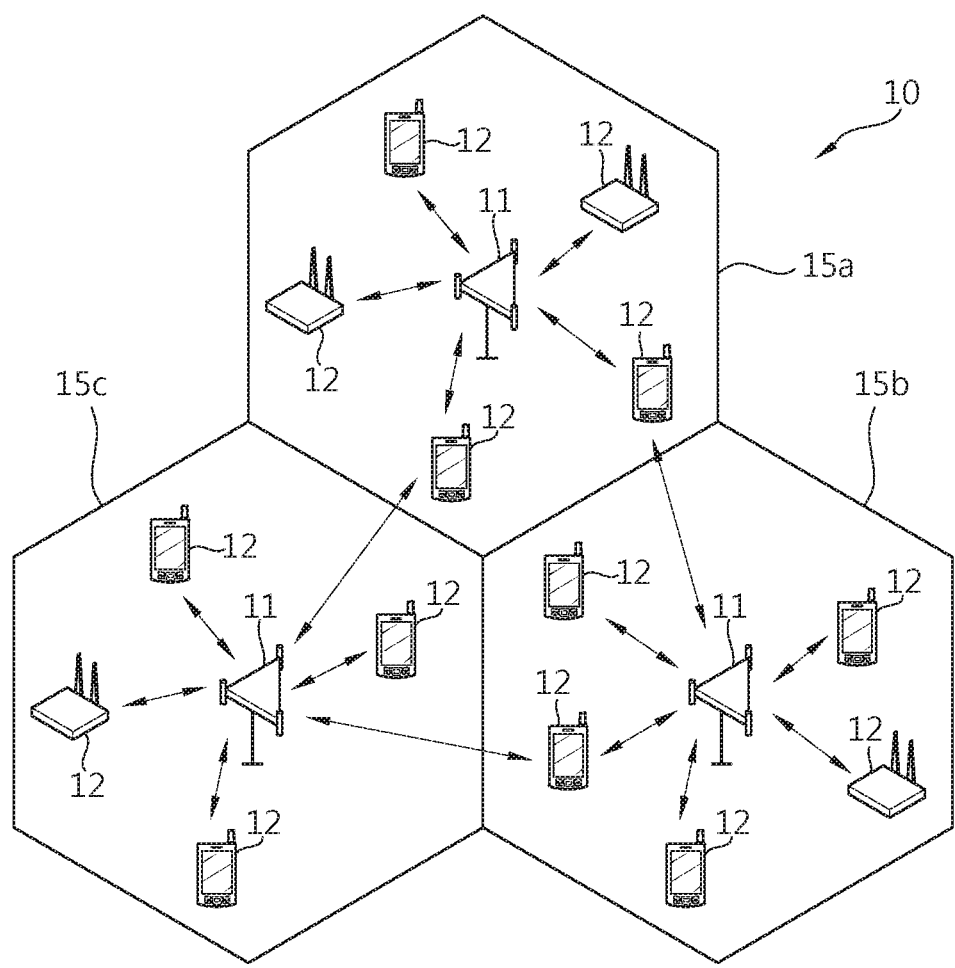
FIG. 1 schematically shows a wireless communication system.

Hereinafter, some exemplary embodiments in the present specification will be described in detail with reference to the illustrative drawings. It is to be noted that in giving reference numerals to components of each of the accompanying drawing, like reference numerals refer to like elements even though the like components are shown in different drawings. Further, in describing exemplary embodiments of the present invention, well-known functions or constructions will not be described in detail since they may unnecessarily obscure the understanding of the present invention.

Further, the present specification describes a wireless communication network as an object. An operation performed in the wireless communication network may control a network in a system (for example, a base station) supervising corresponding wireless communication networks and may be performed during a process of transmitting data or performed in user equipments coupled with the corresponding wireless networks.

FIG. 1 shows a wireless communication system.

Referring to FIG. 1, the wireless communication system 10 is widely distributed in order to provide various communication services, such as audio, packet data, or the like. A wireless communication system 10 includes at least one base station (BS) 11. Each base station 11 provides communication services to specific geographical areas (generally referred to as cells) 15a, 15b, and 15c. A cell may again be divided into a plurality of areas (referred to as sectors).

A mobile station (MS) 12 may be fixed or moved and may be referred to as other terms, such as a user equipment (UE), a mobile terminal (MT), a user terminal (UT), a subscriber station (SS), a wireless device, a personal digital assistant (PDA), a wireless modem, a handheld device, or the like. The base station 11 generally indicates a fixed station communicating with the mobile station 12 and may be referred to as other terms, such as an evolved-node B (eNB), a base transcriber system (BTS), an access point, or the like. The cell is interpreted as comprehensive meaning indicating some areas covered by the base station 11 and means including all of the various coverage areas such as a mega cell, a macro cell, a micro cell, a pico cell, a femto cell, or the like.

Hereinafter, a downlink means communication from the base station 11 to the mobile station 12 and an uplink means communication from the mobile station 12 to the base station 11. In this case, in the downlink, a transmitter may be a portion of the base station 11 and a receiver may be a portion of the mobile station 12. In addition, in the uplink, the transmitter may be a portion of the mobile station 12 and the receiver may be a portion of the base station 11.

Alternatively, in some cases, the downlink means communication from the mobile station 12 to the base station 11, and the uplink means communication from the base station 11 to the mobile station 12. In this case, in the downlink, the transmitter may be a portion of the mobile station 12 and the receiver may be a portion of the base station 11. In addition, in the uplink, the transmitter may be a portion of the base station 11 and the receiver may be a portion of the mobile station 12.

A multiple access method applied to the wireless communication system is not limited. Various multiple access methods such as code division multiple access (CDMA), time division multiple access (TDMA), frequency division multiple access (FDMA), orthogonal frequency division multiple access (OFDMA), single carrier-FDMA (SC-FDMA), OFDM-FDMA, OFDM-TDMA, OFDM-CDMA, or the like, may be used. The uplink transmission and the downlink transmission may use a time division duplex (TDD) scheme that performs transmission at different times or may use a frequency division duplex (FDD) scheme that performs transmission at different frequencies.

Carrier aggregation (CA), which supports a plurality of carriers, is referred to as spectrum aggregation or bandwidth aggregation. The carrier aggregation is introduced in order to support increasing throughput, prevent an increase in a cost due to the introduction of a broadband radio frequency (RF) device, and secure compatibility with the existing systems. For example, when five component carriers are allocated as granularity in a carrier unit having a bandwidth of 5 MHz, a bandwidth of maximum 25 MHz may be supported.

The carrier aggregation may be classified into contiguous carrier aggregation that is performed between continuous component carriers in a frequency domain and non-continuous aggregation that is performed between discontinuous component carriers. The number of carriers aggregated between the downlink and the uplink may be set to be different from each other. The case in which the number of downlink component carriers and the number of uplink component carriers are the same as each other may be referred to as symmetric aggregation and the case in which the number of downlink component carriers and the number of uplink component carriers are different from each other may be referred to asymmetric aggregation.

In addition, sizes (that is, bandwidths) of the component carriers may be different from each other. For example, when five component carriers are used to configure a 70 MHz band, they may be configured as a 5 MHz component carrier (carrier #0)+a 20 MHz component carrier (carrier#1)+a 20 MHz component carrier (carrier#2)+a 20 MHz component carrier (carrier#3)+a 5 MHz component carrier (carrier#4).

Hereinafter, the multiple carrier system is referred to as a system that supports the carrier aggregation. In the multiple carrier system, the contiguous carrier aggregation and/or the non-contiguous carrier aggregation may be used and either of the symmetric aggregation or the asymmetric aggregation may be used.

Figure 2:
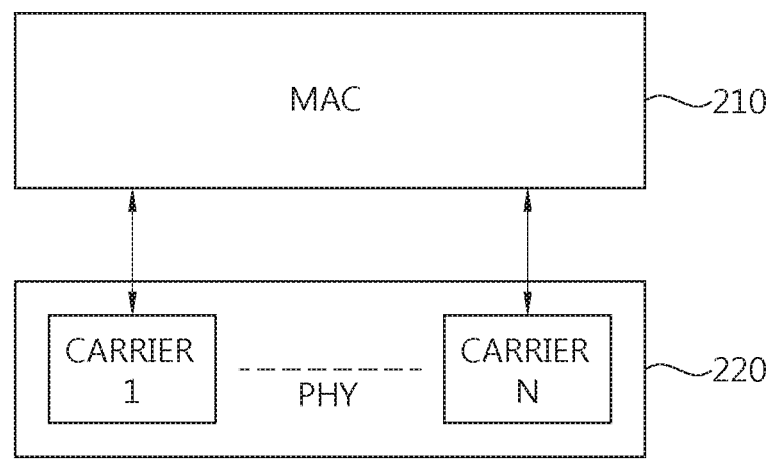
FIG. 2 schematically shows an example of protocol structure for supporting multiple carriers.

FIG. 2 shows an example of a protocol structure for supporting the multiple carriers.

Referring to FIG. 2, a common medium access control (MAC) entity 210 manages a physical layer 220 that uses a plurality of carriers. An MAC management message that is transmitted by a specific carrier may be applied to other carriers. That is, the MAC management message is a message that may include the specific carrier to control other carriers. The physical layer 220 may be operated in a time division duplex (TDD) scheme and/or a frequency division duplex (FDD) scheme.

There are several physical channels used in the physical layer 220. A physical downlink control channel (hereinafter, referred to as a 'PDCCH') informs the user equipment of resource allocation of a paging channel (PCH) and a physical downlink shared channel (hereinafter, referred to as a 'PDSCH') and hybrid automatic repeat request (HARQ) information related to the PDSCH. The PDCCH may carry an uplink grant informing the user equipment of the resource allocation of the uplink transmission and a downlink grant informing the user equipment of the resource allocation of the downlink transmission. A physical control format indicator channel (PCFICH), which is a physical channel transmitting a format indicator indicating the user equipment of a format of the PDCCH, that is, the number of OFDM symbols that configure the PDCCH, is included in each subframe. The format indicator may also be referred to as a control format indicator (CFI).

A physical hybrid ARQ indicator channel (PHICH) carries a HARQ ACK/NACK signal as a response of the uplink transmission. A physical uplink control channel (PUCCH) carries uplink control information such as HARQ ACK/NACK for downlink transmission, scheduling request, a sounding reference signal (SRS), a CQI, and the like. A physical uplink shared channel (PUSCH) carries an uplink shared channel (UL-SCH).

Figure 3:
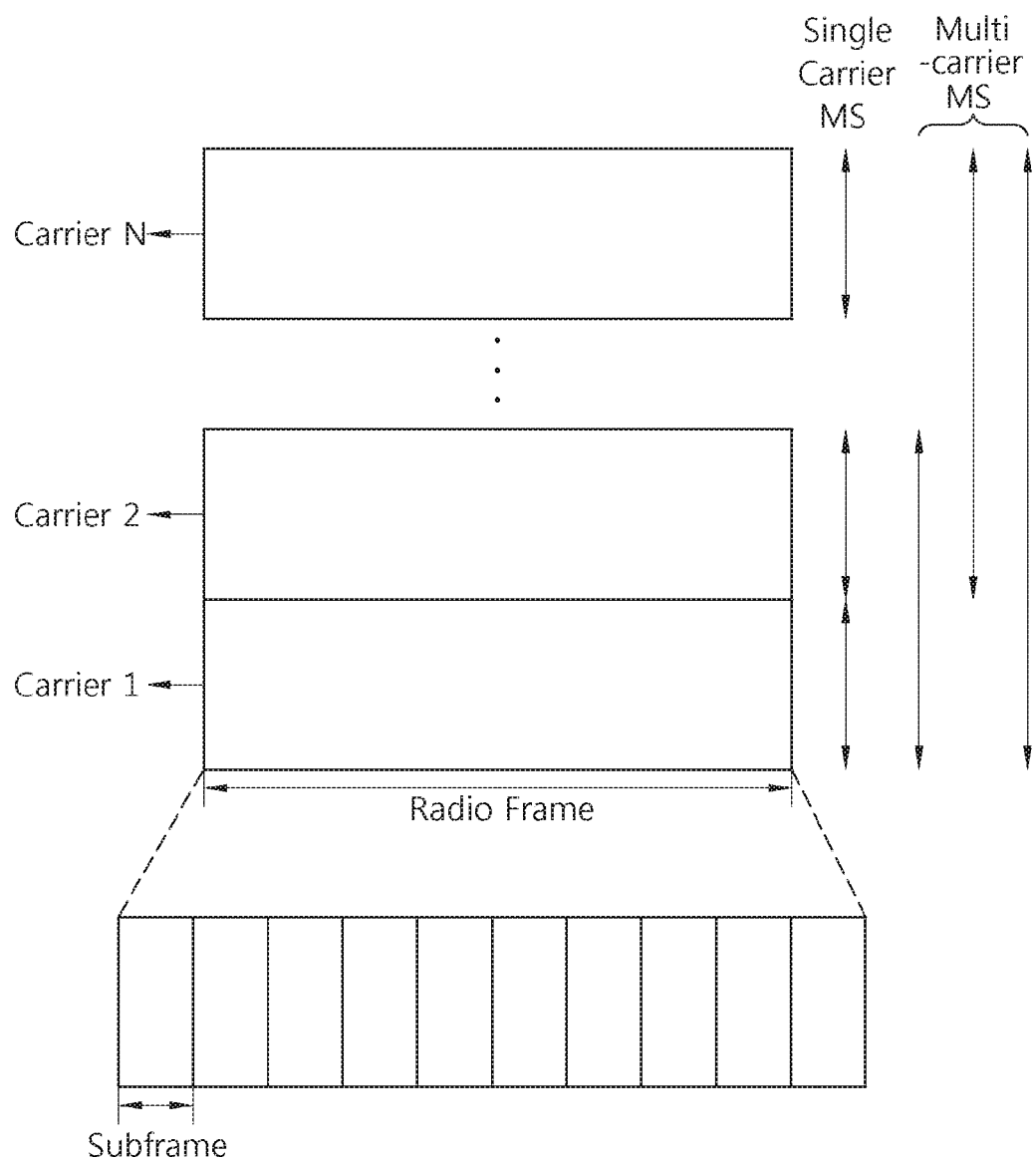
FIG. 3 schematically shows an example of a frame structure for a multiple carrier operation.

FIG. 3 shows an example of a frame structure for a multiple carrier operation.

Referring to FIG. 3, a frame is configured of ten subframes. The subframe includes a plurality of OFDM symbols. Each carrier may have its control channel (for example, a PDCCH). The multiple carriers may be contiguous to each other or may not be contiguous to each other. The user equipment may support one or more carrier according to its own capability.

A component carrier may be divided into a fully configured carrier and a partially configured carrier according to directionality. The fully configured carrier, which is a bidirectional carrier, indicates a carrier capable of transmitting and/or receiving all control signals and data, and the partially configured carrier, which is a unidirectional carrier, indicates a carrier capable of transmitting only downlink data. The partially configured carrier may be mainly used for a multicast and broadcast service (MBS) and/or a single frequency network (SFN).

The component carrier may be divided into a primary component carrier (PCC) and a secondary component carrier (SCC) according to whether or not it is activated. The primary component carrier is a carrier that is being activated at all times and the secondary component carrier is a carrier that is activated/inactivated according to specific conditions. The activation means a state in which transmission or reception of traffic data is performed or is ready. The inactivation means a state in which the transmission or reception of the traffic data may not be performed but the measurement or the transmission or reception of minimum information may be performed. The user equipment may use only a single primary component carrier or one or more secondary component carrier together with the primary component carrier. The user equipment may be allocated with the primary component carrier and/or the secondary component carrier from the base station. The primary component carrier may be the fully configured carrier and be a carrier in which main control information is exchanged between the base station and the user equipment. The secondary component carrier may be the fully configured carrier or the partially configured carrier and be a carrier allocated according to a request of the user equipment or an instruction of the base station. The primary component carrier may be used to allow the user equipment to enter the network and/or allocate the secondary component carrier. The primary component carrier is not fixed to a specific carrier but may be selected among fully configured carriers. A carrier set to the secondary component carrier may be changed into the primary component carrier.

Figure 4:
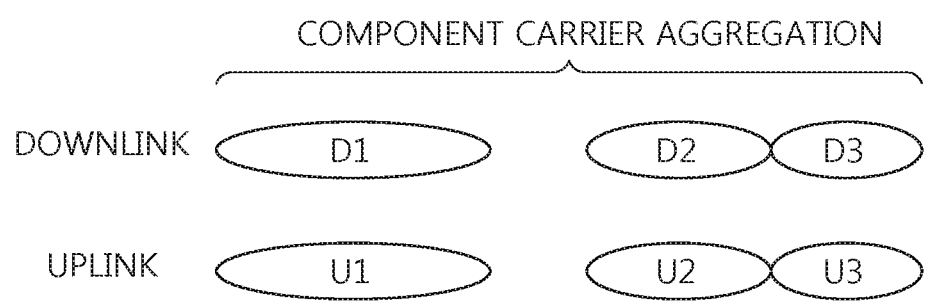
FIG. 4 schematically shows a linkage between downlink component carriers and uplink component carriers in a multiple carrier system.

FIG. 4 shows a linkage between downlink component carriers and uplink component carriers in a multiple carrier system.

Referring to FIG. 4, downlink component carriers D1, D2, and D3 are aggregated in the downlink and uplink component carriers U1, U2, and U3 are aggregated in the uplink. Here, Di is an index of the downlink component carrier, and Ui is an index of the uplink component carrier (i=1, 2, 3). One of the aggregated downlink component carriers is a primary component carrier, and the others thereof are secondary component carriers. Likewise, one of the aggregated uplink component carriers is a primary component carrier, and the others thereof are secondary component carriers. For example, D1 and U1 are the primary component carriers, and D2, U2, D3, and U3 are the secondary component carriers.

In the FDD system, the downlink component carrier and the uplink component carrier are linked with each other on a one-to-one basis and the D1 and the U1, the D2 and the U2, and the D3 and the U3 are linked with each other on a one-to-one basis, respectively. The user equipment performs the linkage between the downlink component carriers and the uplink component carriers through system information transmitted by a logical channel (BCCH) or a user equipment dedicated RRC message transmitted by a DCCH. Each linkage may be set to be cell specific or may be set to be user equipment (UE) specific.

As described above, in the carrier aggregation, the PDCCH may transmit information on allocation of resources in other carriers as well as resources in a carrier to which a corresponding PDCCH pertains. This is called cross-carrier scheduling. Since control information on the secondary component carrier may be transmitted through the primary component carrier in the cross-carrier scheduling, the scheduling may be flexibly performed.

Meanwhile, the PDCCH includes a transmission power control (TPC) controlling uplink transmission power.

A user equipment (UE) specific TPC command is operated in two different modes. An accumulative TPC command may be used for the PUSCH, PUCCH, and the SRS. An absolute TPC command may be used for the PUSCH. The TPC for controlling power of the PUCCH may be transmitted in a state in which it is included in a downlink grant of a DCI transmitted on the PDCCH, and the TPC for controlling power of the PUSCH may be transmitted in a state in which it is included in an uplink grant of the DCI transmitted on the PDCCH.

With respect to the PUSCH, the switching between these two modes is semi-statically performed with respect to each user equipment by RRC signaling.

In the case of the accumulative TPC command, each TPC command signals a power step for a previous power level. The accumulative TPC command is in a default mode and is appropriate for a situation in which the user equipment receives a power control command as a group of continuous subframes. In the accumulative TPC command, two sets are generally provided with respect to power step values. For example, {−1, +1} dB and {−1, 0, +1, +3} dB may be used. Which of the two sets is used is determined by a format of the TPC command and a configuration of the RRC. The reason why a set having a value of 0 dB is used is to allow transmission power to be maintained as it is, as needed.

Transmission power setting by the absolute TPC command is independent of a series of TPC commands that is previously received. The transmission power setting is based only on the most recent received absolute TPC command and independently signals a power offset for a semi-static operation point. The absolute TPC command mode is appropriate for a scenario in which uplink transmission scheduling of the user equipment may be intermittent. The absolute TPC command may control the transmission power of the user equipment so as to be an appropriate power level only at a single step even after transmission gap.

As described above, the TPC command is transferred to the user equipment as a message on the PDCCH. Unless the user equipment is set particularly in a discontinuous reception (DRX) state, it checks the TPC command per each subframe. The TPC command needs not to be periodically transmitted.

One method for transmitting the TPC command to the user equipment is to transmit the TPC command in a state in which the TPC command is included in an uplink resource scheduling allocation message for each specific user equipment. This method is a method of allowing all possible information on uplink transmission to be contained in a single message.

As another method, each accumulative TPC command for a plurality of user equipments may be joint-coded in a particular PDCCH message dedicated to power control and then transmitted. In addition, with respect to the PUCCH, the TPC may also be transferred to the user equipment in a state in which it is included in a downlink resource allocation message on the PDCCH. These methods may allow a change in a channel state to be tracked even in the case in which the user equipment is not scheduled with respect to the uplink data transmission.

Because of a structure of the PDCCH signaling, the TPC command is protected by a cyclic redundancy check (CRC). Therefore, with the exception of the case in which the user equipment does not receive a PDCCH message itself, the received TPC command has high reliability.

In a carrier aggregation environment, the PDCCH of each carrier may transmit the TPC command for the PUCCH of the same uplink component carrier. For example, HARQ ACK/NACK signals for a plurality of downlink component carriers are transmitted through a single uplink component carrier. In this case, at least one same TPC for controlling the power of the same uplink PUCCH may be transmitted through a plurality of downlink component carriers. As a result, this acts as an overhead of the downlink control information. Therefore, in the case in which a plurality of TPCs are present with respect to a single PUCCH due to transmission of a plurality of downlink grants, bits allocated to an overlapped TPC field can be used to transmit other control information, for example, ACK/NACK resource allocation information, thereby making it possible to more efficiently use limited wireless resources.

Figure 5:
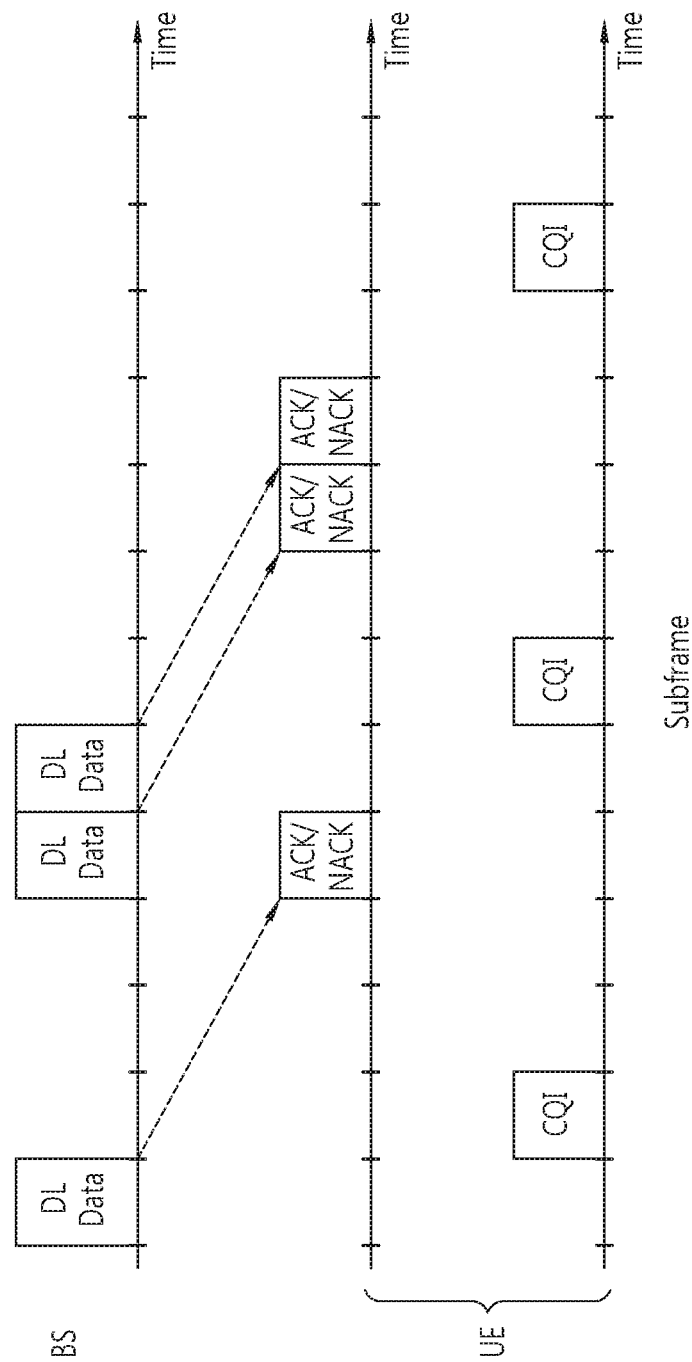
FIG. 5 is a diagram describing downlink hybrid automatic repeat request (HARQ) and channel quality indicator (CQI) transmission.

FIG. 5 shows downlink HARQ and CQI transmission.

Referring to FIG. 5, the user equipment receiving downlink data from the base station transmits ACK/NACK information after a predetermined time elapses. The downlink data may be transmitted on the PDSCH indicated by the PDCCH. The ACK/NACK signal becomes the ACK information when the downlink data is successfully decoded and becomes the NACK information when the decoding of the downlink data fails. The base station may retransmit the downlink data up to the maximum number of retransmissions when it receives the NACK information.

The transmission time or resource allocation of the ACK/NACK signal for the downlink data may be dynamically informed by the base station through signaling or be defined in advance according to the transmission time or the resource allocation of the downlink data.

The user equipment may measure a state of the downlink channel to periodically and/or aperiodically report the CQI to the base station. The base station may use the CQI for the downlink scheduling. The base station may inform the user equipment of information on the transmission time of the CQI or the resource allocation.

Figure 6:
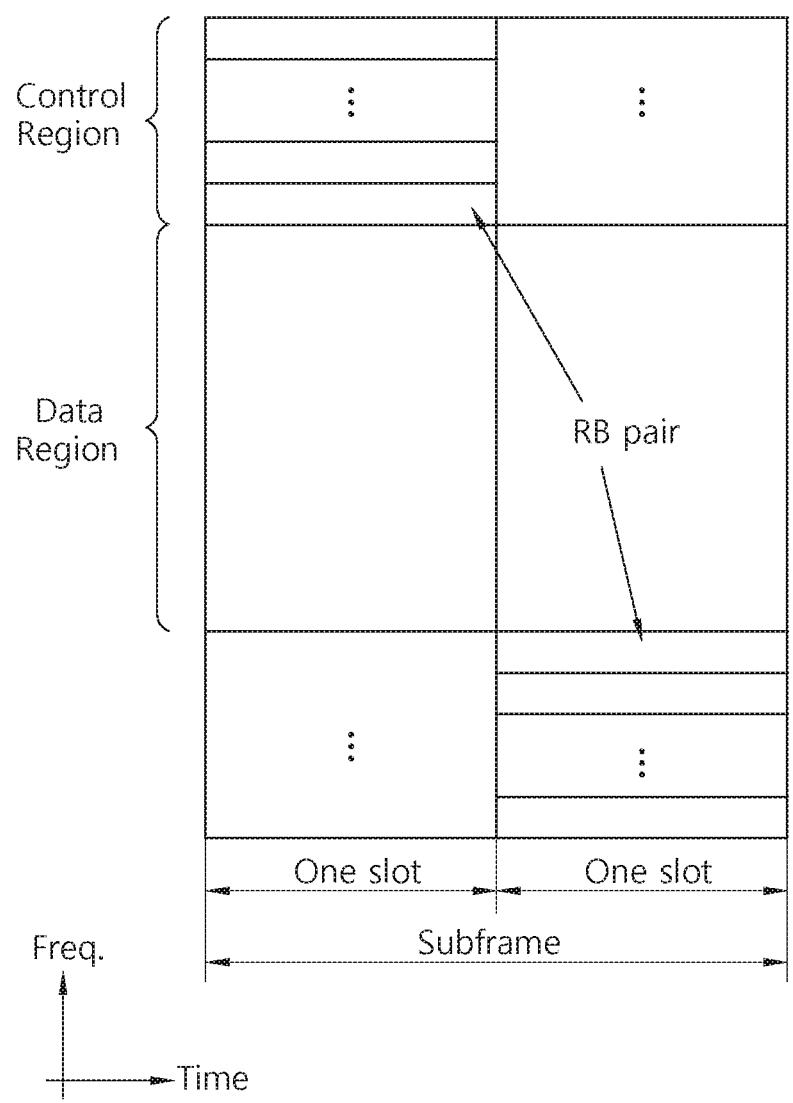
FIG. 6 schematically shows an example of an uplink subframe structure carrying an ACK/NACK signal.

FIG. 6 shows an example of an uplink subframe structure carrying an ACK/NACK signal.

Referring to FIG. 6, the uplink subframe may be divided into a control region to which the PUCCH carrying the uplink control information is allocated and a data region to which the PUSCH carrying the user data is allocated, in a frequency domain. In the case of a single carrier-FDMA (SC-FDMA) system, a single user equipment does not simultaneously transmit both of the PUCCH and the PUSCH in order to maintain single carrier characteristics.

The PUCCH for a single user equipment is allocated to a resource block (RB) pair in a subframe, and resource blocks of the allocated resource block pair are resource blocks corresponding to different subcarriers in each of two slots. This is called that the resource block pair allocated to the PUCCH is frequency-hopped in a slot boundary.

The PUCCH may support multiple formats. That is, it is possible to transmit the uplink control information having a different number of bits per subframe according to a modulation scheme. The following Table 1 shows a modulation scheme and the number of bits according to several PUCCH formats.

TABLE 1

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

A PUCCH format 1 is used to transmit a scheduling request (SR), and PUCCH formats 1a/1b is used to transmit a HARQ ACK/NACK signal. A PUCCH format 2 is used to transmit a CQI, and PUCCH formats 2a/2b is used to transmit a CQI and a HARQ ACK/NACK signal. In the case in which only the HARQ ACK/NACK signal is transmitted, the PUCCH format 1a/1b are used, and in the case in which only the SR is transmitted, the PUCCH format 1 is used.

The control information transmitted on the PUCCH uses a cyclically shifted sequence. The cyclically shifted sequence is obtained by cyclically shifting a base sequence by a specific cyclic shift amount.

In the case in which a single resource block includes 12 subcarriers, a sequence having a length of 12 as in the following Equation 1 is used as the base sequence.

$$r_i(n) = e^{jb(n)\pi/4} \quad \text{[Equation 1]}$$

Where $i \in \{0, 1, \ldots, 29\}$ indicates a root index, n indicates a component index ($0 \leq n \leq N-1$), and N indicates a length of a sequence. Different base sequences are defined according to different root indices. When N=12, b(n) is defined as represented by the following Table 2.

TABLE 2

| 1 | b(0), . . . , b(11) | | | | | | | | | | |
|---|---|---|---|---|---|---|---|---|---|---|---|
| 0 | -1 | 1 | 3 | -3 | 3 | 3 | 1 | 1 | 3 | 1 | -3 | 3 |
| 1 | 1 | 1 | 3 | 3 | 3 | -1 | 1 | -3 | -3 | 1 | -3 | 3 |
| 2 | 1 | 1 | -3 | -3 | -3 | -1 | -3 | -3 | 1 | -3 | 1 | -1 |
| 3 | -1 | 1 | 1 | 1 | 1 | -1 | -3 | -3 | 1 | -3 | 3 | -1 |
| 4 | -1 | 3 | 1 | -1 | 1 | -1 | -3 | -1 | 1 | -1 | 1 | 3 |

TABLE 2-continued

| 1 | b(0), . . . , b(11) | | | | | | | | | | |
|---|---|---|---|---|---|---|---|---|---|---|---|
| 5 | 1 | -3 | 3 | -1 | -1 | 1 | 1 | -1 | -1 | 3 | -3 | 1 |
| 6 | -1 | 3 | -3 | -3 | -3 | 3 | 1 | -1 | 3 | 3 | -3 | 1 |
| 7 | -3 | -1 | -1 | -1 | 1 | -3 | 3 | -1 | 1 | -3 | 3 | 1 |
| 8 | 1 | -3 | 3 | 1 | -1 | -1 | -1 | 1 | 1 | 3 | -1 | 1 |
| 9 | 1 | -3 | -1 | 3 | 3 | -1 | -3 | 1 | 1 | 1 | 1 | 1 |
| 10 | -1 | 3 | -1 | 1 | 1 | -3 | -3 | -1 | -3 | -3 | 3 | -1 |
| 11 | 3 | 1 | -1 | -1 | 3 | 3 | -3 | 1 | 3 | 1 | 3 | 3 |
| 12 | 1 | -3 | 1 | 1 | -3 | 1 | 1 | 1 | -3 | -3 | -3 | 1 |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 1 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | -3 | 1 | -1 | -3 |
| 22 | 1 | 1 | -3 | -3 | -3 | -3 | -1 | 3 | -3 | 1 | -3 | 3 |
| 23 | 1 | 1 | -1 | -3 | -1 | -3 | 1 | -1 | 1 | 3 | -1 | 1 |
| 24 | 1 | 1 | 3 | 1 | 3 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

Therefore, the base sequence r(n) may be cyclically shifted as represented by the following Equation 2.

$$r(n,a) = r((n+a) \bmod N), \text{ for } n=0, \ldots, N-1 \quad \text{[Equation 2]}$$

Where 'a' indicates a cyclic shift (CS) amount, and 'mod' indicates a modulo operation.

Figure 7:
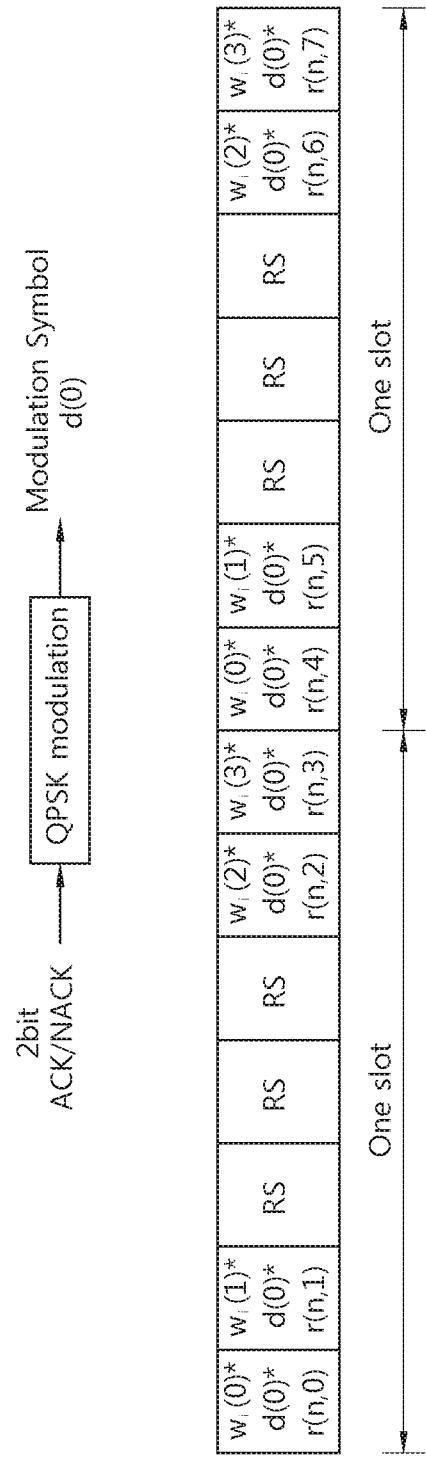
FIG. 7 is a diagram showing a state in which an ACK/NACK signal is transmitted on a physical uplink control channel (PUCCH).

FIG. 7 shows a state in which ACK/NACK signal is transmitted on a PUCCH.

Referring to FIG. 7, reference signals (RSs) are carried in three of seven SC-FDMA symbols included in a single slot, and ACK/NACK signals are carried in the others thereof. The RSs are carried in three contiguous SC-FDMA symbols disposed at the center of the slot.

In order to transmit the ACK/NACK signal, a 2 bit ACK/NACK signal is quadrature phase shift keying (QPSK) modulated to generate a single modulation symbol d(0). A modulated sequence y(n) is generated based on the modulation symbol d(0) and the cyclically shifted sequence r(n,a). The modulated sequence y(n) as represented by the following Equation 3 may be generated by multiplying the cyclically shifted sequence r(n,a) by the modulation symbol.

$$y(n) = d(0)r(n,a) \quad \text{[Equation 3]}$$

A CS amount of the cyclically shifted sequence r(n,a) may be different or be the same for each SC-FDMA symbol. Although the exemplary embodiment of the present invention exemplifies that the CS amounts a are sequentially set to 0, 1, 2, and 3 with respect to four SC-FDMA symbols in a single slot, this is only an example.

Although the exemplary embodiment of the present invention exemplifies that the 2 bit ACK/NACK signal is QPSK modulated to generate a single modulation symbol, a 1 bit ACK/NACK signal may also be binary phase shift keying (BPSK) modulated to generate a single modulation symbol. The number of bits of the ACK/NACK signal, the modulation scheme, and the number of the modulation symbols are only examples and do not limit the technical idea of the present invention.

Further, in order to increase user equipment capacity, the modulated sequence may again be spread using an orthogonal sequence (OS). As an orthogonal sequence $w_i(k)$ (where i indicates a sequence index and 0≤k≤K−1) having a spreading factor (K) of 4, sequences as represented by the following Table 3 may be used.

TABLE 3

| Sequence index | [w(0), w(1), w(2), w(3)] |
|---|---|
| 0 | [+1 +1 +1 +1] |
| 1 | [+1 −1 +1 −1] |
| 2 | [+1 −1 −1 +1] |

Alternatively, as an orthogonal sequence $w_i(k)$ (where i indicates a sequence index and 0≤k≤K−1) having a spreading factor (K) of 3, sequences as represented by the following Table 4 may be used.

TABLE 4

| Sequence index | [w(0), w(1), w(2)] |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

The exemplary embodiment shows that the modulated sequence is spread through the orthogonal sequence $w_i(k)$ having the spreading factor (K) of 4 with respect to four SC-FDMA symbols in a single slot for an ACK/NACK signal.

The RS may be generated from the same base sequence as that of the ACK/NACK and be generated based on the cyclically shifted sequence and the orthogonal sequence. That is, the cyclically shifted sequence is spread through the orthogonal sequence $w_i(k)$ having the spreading factor (K) of 3, such that it may be used as the RS.

A resource index $n^{(1)}_{PUCCH}$, which is a resource for transmission of the PUCCH formats 1/1a/1b is used in order to determine a CS amount $\alpha(n_s,l)$ of the base sequence and an orthogonal sequence index $n_{OC}(n_s)$ as well as a position of a physical resource block in which the ACK/NACK signal is transmitted. In addition, the resource index $n^{(1)}_{PUCCH}$ for the HARQ ACK/NACK signal is calculated as represented by the following Table 5. The resource index $n^{(1)}_{PUCCH}$ is a parameter determining a physical RB index nPRB, the CS amount $\alpha(n_s,l)$ of the base sequence, the orthogonal sequence index $n_{OC}(n_s)$, and the like.

TABLE 5

| | Dynamic scheduling | Semi-persistent scheduling |
|---|---|---|
| Resource index | $n^{(1)}_{PUCCH} = n_{CCE} + N^{(1)}_{PUCCH}$ | Signaled by higher layer or a control channel |
| Higher Layer Signaling value | $N^{(1)}_{PUCCH}$ | $n^{(1)}_{PUCCH}$ |

That is, referring to Table 5, a HARQ ACK/NACK signal for a PDSCH transmitted in an $n^{th}$ subframe is transmitted in an $n+4^{th}$ subframe using the resource index $n^{(1)}_{PUCCH}$, which is the sum of a first control channel element (CCE) index $n_{CCE}$ of a PDCCH transmitted in the $n^{th}$ subframe and a value $N^{(1)}_{PUCCH}$ obtained through higher layer signaling or a separate control channel. The $N^{(1)}_{PUCCH}$ is the total number of PUCCH formats 1/1a/1b resources required for semi-persistent scheduling (SPS) transmission and service request (SR) transmission. Since a PDCCH indicating corresponding PDSCH transmission is not present in the semi-persistent scheduling transmission and the SR transmission, the base station explicitly informs the user equipment of the $n^{(1)}_{PUCCH}$.

When the HARQ ACK/NACK signal and/or the SR are transmitted through the PUCCH formats 1/1a/1b, the physical RB index $n_{PRB}$ is determined by the resource index $n^{(1)}_{PUCCH}$. This is represented by the following Equation 4.

[Equation 4]

$$m = \begin{cases} N^{(2)}_{RB} & \text{if } n^{(1)}_{PUCCH} < c \cdot N^{(1)}_{cs} / \Delta^{PUCCH}_{shift} \\ \left\lfloor \dfrac{n^{(1)}_{PUCCH} - c \cdot N^{(1)}_{cs} / \Delta^{PUCCH}_{shift}}{c \cdot N^{RB}_{sc} / \Delta^{PUCCH}_{shift}} \right\rfloor + & \\ N^{(2)}_{RB} + \left\lceil \dfrac{N^{(1)}_{cs}}{8} \right\rceil & \text{otherwise} \end{cases}$$

$$c = \begin{cases} 3 & \text{normal cyclic prefix} \\ 2 & \text{extended cyclic prefix} \end{cases}$$

$m_{PRB} =$ $$\begin{cases} \left\lfloor \dfrac{m}{2} \right\rfloor & \text{if}(m + n_s \text{ mod 2})\text{mod 2} = 0 \\ N^{UL}_{RB} - 1 - \left\lfloor \dfrac{m}{2} \right\rfloor & \text{if}(m + n_s \text{ mod 2})\text{mod 2} = 1 \end{cases}$$

Figure 8:
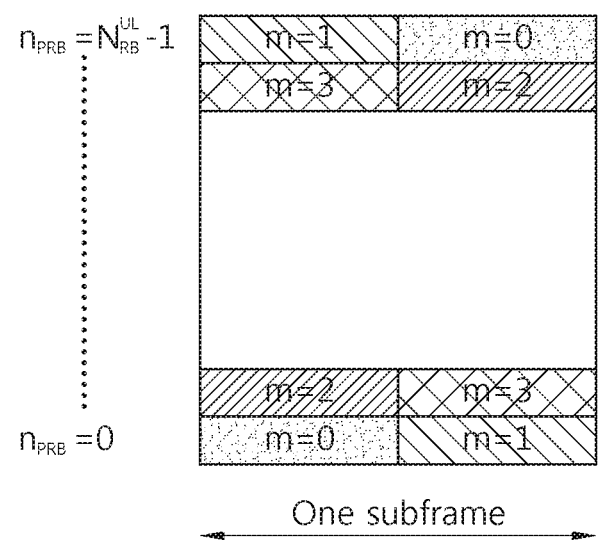
FIG. 8 is a diagram showing an example in which a PUCCH is mapped to physical RBs according to Equation 4.

FIG. 8 shows an example in which a PUCCH is mapped to physical RBs according to Equation 4. The physical RB index $n_{PRB}$ is determined according to the resource index $n^{(1)}_{PUCCH}$, and the PUCCHs corresponding to each m are frequency-hopped in a slot unit.

In the carrier aggregation (CA) environment, the HARQ ACK/NACK signals for the plurality of downlink component carriers are transmitted through a single uplink component carrier. Here, a 1 bit ACK/NACK signal is transmitted per one codeword (CW).

The HARQ ACK/NACK signal for the downlink is transmitted on the PUCCH. As a PUCCH format transmitting the HARQ ACK/NACK signal for the downlink, there are PUCCH formats 1a/1b. The PUCCH format 1b with channel selection may transmit a 2 to 4 bit ACK/NACK signal.

The channel selection allocates the HARQ ACK/NACK resources for the downlink using a table in which messages to be transmitted, resources to be used for transmitting corresponding messages, and modulation symbols are mapped to each other. A channel selection table may be configured of a combination of a plurality of resource indices and modulation symbols of the ACK/NACK signal and be configured in consideration of the number (M) of bits used to transmit the ACK/NACK signal. Since resources required for transmitting the signal having maximum 4 bits may be allocated through the channel selection, a table may be configured according to a value of the number M of bits required for transmitting the ACK/NACK signal and the ACK/NACK resources may be allocated using the table, with respect to 4 bit or less ACK/NACK signal.

Information on a format of the table used for the channel selection may be transmitted in advance to the user equipment and the base station through the higher layer signaling. The user equipment may obtain an ACK/NACK resource index for configuring the table used for the channel selection through the received PDCCH, separate signaling from the higher layer channel, a transmission channel, or the like.

In order to transmit the ACK/NACK signal, the base station may implicitly allocate the ACK/NACK resource index. The meaning that the base station implicitly allocates the ACK/NACK resource index is that the base station allocates a resource index calculated by using $n_{CCE}$ indicating a number of a CCE in at least one CCE that configures a PDCCH of CC#a by a parameter. In the present specification, the implicit allocation of the resource index by the base station is represented by 'implicit obtaining of the resource index' in view of the user equipment.

The base station may also explicitly allocate the resource index. The meaning that the base station explicitly allocates the resource index is that the base station allocates a resource index of a PUCCH dedicated to a specific user equipment to the user equipment through a separate resource allocation indicator of the base station, or the like, without depending on $n_{CCE}$. Here, the separate resource allocation indicator from the base station includes signaling from a higher layer or a physical layer, or the like. Further, the resource allocation indicator may also be included as control information or system information in the PDCCH. In the present specification, the explicit allocation of the resource index by the base station is represented by explicit obtaining of the resource index' in view of the user equipment.

Here, the base station may use resources to be used for an indicator for transferring other control information in order to transfer the resource allocation indicator. For example, the base station may use resources to be used for transmitting a power indicator (PI) for uplink transmission power such as a TPC command in order to transmit a resource allocation indicator such as an ACK/NACK resource indicator (ART). The ARI is an indicator explicitly allocating resources to be used by the user equipment at the time of transmission of the HARQ ACK/NACK signal for the downlink. A DCI format indicating a downlink grant includes a 2 bit TPC field for controlling power for the PUCCH, and a DCI format indicating an uplink grant includes a 2 bit TPC field for controlling power for the PUSCH.

Figure 9:
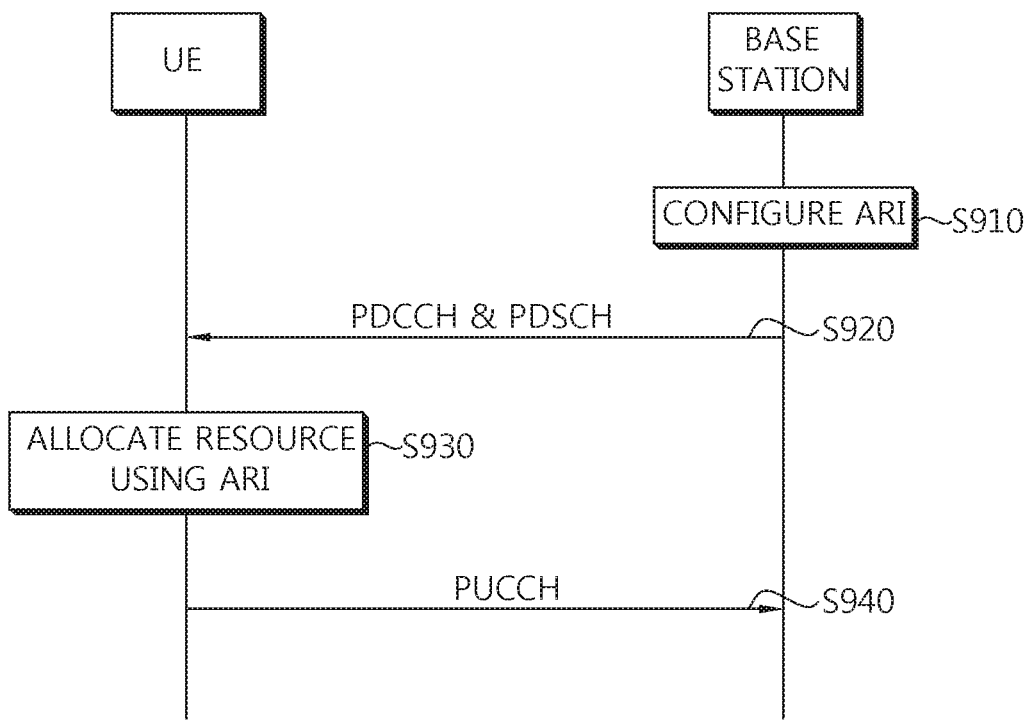
FIG. 9 is a diagram schematically showing that an ACK/NACK resource indicator (ARI) is transmitted by diverting resources allocated to an overlapped transmission power control (TPC) field in a multiple component carrier system.

FIG. 9 is a diagram schematically showing that an ARI is transmitted by diverting resources allocated to an overlapped TPC field in a multiple component carrier system.

In the carrier aggregation (CA) environment, the base station may configure the ARI using 2 bits allocated to the overlapped TCP field in order to allocate the resources to be used for the uplink signal transmission (S910). The ARI is an indicator explicitly allocating the resources to be used by the user equipment at the time of transmission of the HARQ ACK/NACK signal for the downlink.

The base station transmits required information the user equipment on the PDCCH and PDSCH through the component carriers (S920). In the carrier aggregation (CA) environment, when a plurality of component carriers are transmitted from the base station, for example, when the secondary component carrier is transmitted together with the primary component carrier, a TPC field on the PDCCH of the secondary component carrier is overlapped with that of the primary component carrier. The base station may transmit the ARI by diverting bits allocated to the TPC field on the overlapped secondary component carrier.

The user equipment may check the PDCCHs of the component carriers received from the base station and may be explicitly allocated with the resources from the ARI transmitted by diverting the bits allocated to the TPC field on the secondary component carrier (S930).

The user equipment may transmit control information on the PUCCH using the allocated transmission resources (S940).

Hereinafter, a method for allocating ACK/NACK resources using an ARI will be described in detail.

In the following description, the ARI is transferred to the user equipment by diverting 2 bits to be allocated to the TPC field. In this case, a TPC field of a PDCCH corresponding to a PDSCH on the primary component carrier may be used as the TPC command, and a TPC field of a PDCCH corresponding to a PDSCH on the secondary component carrier may be used as the ARI.

Information on an ARI resource mapping table for allocating the resources to the ARI may be transmitted to the user equipment in advance through the higher layer signaling. The ARI resource mapping table is configured of a value of the ARI and ACK/NACK transmission resources allocated according to the value of the ARI. The number of ACK/NACK transmission resources required for configuring the ARI resource mapping table is determined by the number of secondary component carriers configured through the RRC and a transmission mode. Although the exemplary embodiment of the present invention describes that the transmission mode is related to whether a single codeword will be transmitted or two codewords will be transmitted for each component carrier in the subframe, the present invention is not limited thereto. That is, the transmission mode may reflect various transmission forms, and the ACK/NACK transmission resources, that is, the resources required for transmitting the ACK/NACK signal may be determined by various transmission modes.

The ARI resource mapping table may be changed according to the number of ACK/NACK transmission resources as described above. In the case of transmitting the HARQ ACK/NACK signal in the PUCCH formats 1a/1b in the carrier aggregation environment, the number of ACK/NACK transmission resources required for transmitting the ACK/NACK signal for the PDSCH transmitted by the secondary component carrier is 1 to 4. That is, in the case of transmitting the ACK/NACK signal using a single antenna, the number of resources for the PDSCH that may be transmitted by the secondary component carrier is 1 to 4. The case in which the number of resources for the PDSCH that may be transmitted by the secondary component carrier is 4 corresponds to a case in which the PDSCH is not scheduled by the primary component carrier, that is, a case in which the PDSCH is scheduled only by the secondary component carrier. In this case, transmission resources up to maximum 4 are required.

The case in which a single ACK/NACK transmission resource is required may include, for example, a case in which a PDSCH configured of a single codeword is transmitted through a secondary component carrier.

The case in which two ACK/NACK transmission resources are required may include, for example, a case in which a PDSCH configured of two codewords is transmitted through a secondary component carrier or a case in which each of PDSCHs configured of a single codeword is transmitted through two secondary component carriers.

The case in which three ACK/NACK transmission resources are required may include, for example, a case in which a PDSCH configured of a single codeword is transmitted through one secondary component carrier and a PDSCH configured of two codewords is transmitted through another secondary component carrier or a case in which each of PDSCHs configured of a single codeword is transmitted through three secondary component carriers.

The case in which four ACK/NACK transmission resources are required may include, for example, a case in which each of PDSCHs configured of two codewords is transmitted through two secondary component carriers, a case in which a PDSCH configured of two codewords is transmitted through one secondary component carrier and each of PDSCHs configured of a single codeword is transmitted through the other two secondary component carriers, or a case in which each of PDSCHs configured of a single codeword is transmitted through four secondary component carriers.

Since ACK/NACK transmission resources for the PDSCH indicated by the PDCCH transmitted through the primary component carrier are implicitly allocated, they need not to be explicitly allocated through the ARI.

Hereinafter, each of the cases will be described in detail, according to the number of ACK/NACK transmission resources required for transmitting the ACK/NACK signal for the PDSCH through the secondary component carrier.

(1) In the Case in which a Single ACK/NACK Transmission Resource is Required

Information on the ARI resource mapping table may be transferred to the user equipment in advance through the higher layer signaling. That is, four explicitly allocated resource sets and ARI values corresponding thereto may be transferred to the user equipment in advance through the higher layer signaling.

Since a single ACK/NACK transmission resource is required in this case, each resource set has an element corresponding to a single ACK/NACK transmission resource.

For example, when it is assumed that the resource sets transferred in advance through the higher layer signaling are {n1}, {n2}, {n3}, and {n4}, the ARI resource mapping table may be configured as represented by the following Table 6.

TABLE 6

| ACK/NACK Resource Indicator | Mapped ACK/NACK Transmission Resource |
|---|---|
| 00 | First Resource Set, that is, {n1} |
| 01 | Second Resource Set, that is, {n2} |
| 10 | Third Resource Set, that is, {n3} |
| 11 | Fourth Resource Set, that is, {n4} |

Table 6 is an ARI resource mapping table configured for convenience in order to easily describe the present invention. Therefore, specific values on the ARI resource mapping table according to the present invention are not limited thereto. For example, the ARI resource mapping table is not configured of the sets having a single element but may also be configured of each element of a single set {n1, n2, n3, n4}.

Here, a 2 bit TPC on the PDCCH for the PDSCH of the secondary component carrier among a plurality of component carriers transmitted on the downlink may be diverted and used as the ARI. The ACK/NACK transmission resources may be allocated according the ARI value on the PDCCH for the PDSCH of the received secondary component carrier. For example, in the case in which the ARI is '00', the resource set {n1} may be allocated.

(2) In the Case in which Two ACK/NACK Transmission Resources are Required

The ARI resource mapping table may be transferred to the user equipment in advance through the higher layer signaling. That is, explicitly allocated resource sets and ARI values corresponding thereto may be transferred to the user equipment in advance through the higher layer signaling.

Since two ACK/NACK transmission resources are required in this case, resource sets may be four sets each having elements corresponding to two ACK/NACK transmission resources or two sets each having elements corresponding to four ACK/NACK transmission resources.

When the resource sets transferred in advance through the higher layer signaling are the four sets each having the elements corresponding to the two ACK/NACK transmission resources, for example, {n1, n2}, {n3, n4}, {n5, n6}, and {n7, n8}, the ARI resource mapping table may be configured as represented by Table 7.

TABLE 7

| ACK/NACK Resource Indicator | Mapped ACK/NACK Transmission Resource |
|---|---|
| 00 | First Resource Set, that is, {n1, n2} |
| 01 | Second Resource Set, that is, {n3, n4} |
| 10 | Third Resource Set, that is, {n5, n6} |
| 11 | Fourth Resource Set, that is, {n7, n8} |

When the resource sets transferred in advance through the higher layer signaling are the two sets each having the elements corresponding to the four ACK/NACK transmission resources, for example, {n1, n2, n3, n4} and {n5, n6, n7, n8}, the ARI resource mapping table may be configured as represented by Table 8.

TABLE 8

| ACK/NACK Resource Indicator | Mapped ACK/NACK Transmission Resource |
|---|---|
| 00 | First Resources in Each Set, that is, {n1, n5} |
| 01 | Second Resources in Each Set, that is, {n2, n6} |
| 10 | Third Resources in Each Set, that is, {n3, n7} |
| 11 | Fourth Resources in Each Set, that is, {n4, n8} |

Tables 7 and 8 are ARI resource mapping tables configured for convenience in order to easily describe the present invention. Therefore, specific values on the ARI resource mapping table according to the present invention are not limited thereto.

Here, a 2 bit TPC on the PDCCH for the PDSCH of the secondary component carrier among a plurality of component carriers transmitted on the downlink may be diverted and used as the ARI. The ACK/NACK transmission resources may be allocated according the ARI value on the PDCCH for the PDSCH of the received secondary component carrier.

For example, in the case in which the ARI is '00', the resource set {n1, n2} may be allocated in Table 7. Further, in the case in which the ARI is '00', the resource set {n1, n5} may be allocated in Table 8.

(3) in the Case in which Three ACK/NACK Transmission Resources are Required

The ARI resource mapping table may be transferred to the user equipment in advance through the higher layer signaling. That is, explicitly allocated resource sets and ARI values corresponding thereto is transferred to the user equipment in advance through the higher layer signaling.

Since three ACK/NACK transmission resources are required in this case, resource sets may be four sets each having elements corresponding to three ACK/NACK transmission resources or three sets each having elements corresponding to four ACK/NACK transmission resources.

When the resource sets transferred in advance through the higher layer signaling are the four sets each having the elements corresponding to the three ACK/NACK transmission resources, for example, {n1, n2, n3}, {n4, n5, n6}, {n7, n8, n9}, and {n10, n11, n12}, the ARI resource mapping table may be configured as represented by Table 9.

TABLE 9

| ACK/NACK Resource Indicator | Mapped ACK/NACK Transmission Resource |
|---|---|
| 00 | First Resource Set, that is, {n1, n2, n3} |
| 01 | Second Resource Set, that is, {n4, n5, n6} |
| 10 | Third Resource Set, that is, {n7, n8, n9} |
| 11 | Fourth Resource Set, that is, {n10, n11, n12} |

When the resource sets transferred in advance through the higher layer signaling are the three sets each having the elements corresponding to the four ACK/NACK transmission resources, for example, {n1, n2, n3, n4}, {n5, n6, n7, n8}, and {n9, n10, n11, n12}, the ARI resource mapping table may be configured as represented by Table 10.

TABLE 10

| ACK/NACK Resource Indicator | Mapped ACK/NACK Transmission Resource |
|---|---|
| 00 | First Resources in Each Set, that is, {n1, n5, n9} |
| 01 | Second Resources in Each Set, that is, {n2, n6, n10} |
| 10 | Third Resources in Each Set, that is, {n3, n7, n11} |
| 11 | Fourth Resources in Each Set, that is, {n4, n8, n12} |

Tables 9 and 10 are ARI resource mapping tables configured for convenience in order to easily describe the present invention. Therefore, specific values on the ARI resource mapping table according to the present invention are not limited thereto.

Here, a 2 bit TPC on the PDCCH for the PDSCH of the secondary component carrier among a plurality of component carriers transmitted on the downlink may be diverted and used as the ARI. The ACK/NACK transmission resources may be allocated according the ARI value on the PDCCH for the PDSCH of the received secondary component carrier.

For example, in the case in which the ARI is '00', the resource set {n1, n2, n3} may be allocated in Table 9. Further, in the case in which the ARI is '00', the resource set {n1, n5, n9} may be allocated in Table 10.

(4) In the Case in which Four ACK/NACK Transmission Resources are Required

The ARI resource mapping table may be transferred to the user equipment in advance through the higher layer signaling. That is, explicitly allocated resource sets and ARI values corresponding thereto is transferred to the user equipment in advance through the higher layer signaling.

Since four ACK/NACK transmission resources are required in this case, resource sets may be four sets each having elements corresponding to four ACK/NACK transmission resources.

When the resource sets transferred in advance through the higher layer signaling are the four sets each having the elements corresponding to the four ACK/NACK transmission resources, for example, {n1, n2, n3, n4}, {n5, n6, n7, n8}, {n9, n10, n11, n12}, and {n13, n14, n15, n16}, the ARI resource mapping table may be configured as represented by Table 11.

TABLE 11

| ACK/NACK Resource Indicator | Mapped ACK/NACK Transmission Resource |
|---|---|
| 00 | First Resource Set, that is, {n1, n2, n3, n4} |
| 01 | Second Resource Set, that is, {n5, n6, n7, n8} |
| 10 | Third Resource Set, that is, {n9, n10, n11, n12} |
| 11 | Fourth Resource Set, that is, {n13, n14, n15, n16} |

When the resource sets transferred in advance through the higher layer signaling are, for example, {n1, n2, n3, n4}, {n5, n6, n7, n8}, {n9, n10, n11, n12}, and {n13, n14, n15, n16}, the ARI resource mapping table may also be configured as represented by Table 12.

TABLE 12

| ACK/NACK Resource Indicator | Mapped ACK/NACK Transmission Resource |
|---|---|
| 00 | First Resources in Each Set, that is, {n1, n5, n9, n13} |
| 01 | Second Resources in Each Set, that is, {n2, n6, n10, n14} |
| 10 | Third Resources in Each Set, that is, {n3, n7, n11, n15} |
| 11 | Fourth Resources in Each Set, that is, {n4, n8, n12, n16} |

Tables 11 and 12 are ARI resource mapping tables configured for convenience in order to easily describe the present invention. Therefore, specific values on the ARI resource mapping table according to the present invention are not limited thereto.

Here, a 2 bit TPC on the PDCCH for the PDSCH of the secondary component carrier among a plurality of component carriers transmitted on the downlink may be diverted and used as the ARI. The ACK/NACK transmission resources may be allocated according the ARI value on the PDCCH for the PDSCH of the received secondary component carrier.

For example, in the case in which the ARI is '00', the resource set {n1, n2, n3, n4} may be allocated in Table 11. Further, in the case in which the ARI is '00', the resource set {n1, n5, n9, n13} may be allocated in Table 12.

Information on the number of required ACK/NACK transmission resources and the ARI mapping table therefor may be transferred to the user equipment in advance through the higher layer signaling.

Although the exemplary embodiment of the present invention describes the case of transmitting the HARQ ACK/NACK signal using a single antenna, the present invention may also be applied to a case of using spatial orthogonal resource transmit diversity (SORTD). In the case of using the SORTD, another transmission resource to be allocated to a second antenna may be required in order to explicitly allocate the transmission resource for the second antenna through the ARI. Even in this case, information on the number of required ACK/NACK transmission resources and the ARI mapping table therefor may be transferred to the user equipment in advance through the higher layer signaling.

Meanwhile, with respect to 4 bit or less HARQ ACK/NACK information, it is possible to allocate the resources through the PUCCH format 1b with cannel selection. The channel selection for allocating HARQ ACK/NACK resources will be described in detail.

Information on a format of the table for channel selection may be transmitted in advance to the user equipment and the base station through the higher layer signaling.

The user equipment may be implicitly or explicitly allocated with the ACK/NACK transmission resources for configuring a signal transmission table.

In the multiple component carrier system, the user equipment may be implicitly allocated with the HARQ ACK/NACK transmission resources for the PDSCH indicated by the PDCCH transmitted through the primary component carrier. The user equipment may implicitly or explicitly allocated with the HARQ ACK/NACK transmission resources for the PDSCH indicated by the PDCCH transmitted through the secondary component carrier. In the case in which the HARQ ACK/NACK resources are explicitly allocated, the above-mentioned ARI may also be used.

Figure 10:
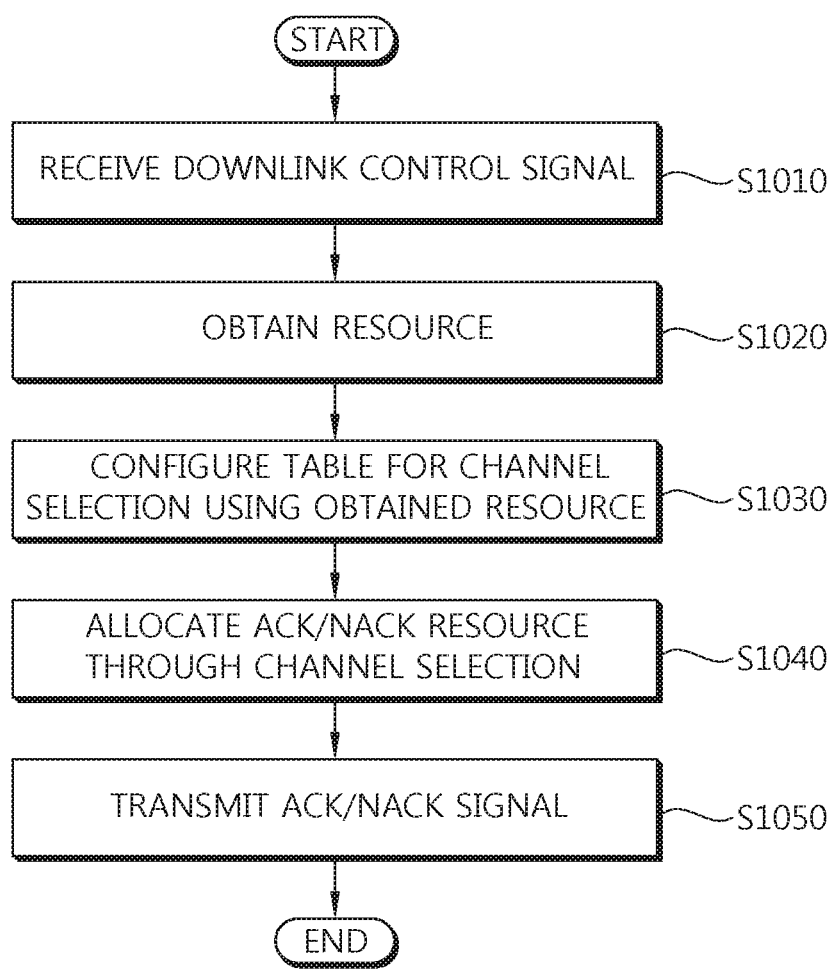
FIG. 10 is a flow chart schematically describing an example in which a user equipment allocates ACK/NACK resources through channel selection to transmit a HARQ ACK/NACK signal.

FIG. 10 is a flow chart schematically describing an example in which a user equipment allocates ACK/NACK resources through channel selection to transmit a HARQ ACK/NACK signal.

The user equipment receives a plurality of component carriers from the base station and receives control signals on PDCCHs of the component carriers (S1010).

The user equipment may implicitly or explicitly obtain required ACK/NACK resources through the control signals transmitted on the PDCCHs (S1020).

The user equipment may implicitly obtain a resource index ($n_{PUCCH,0}$) for allocating ACK/NACK resources on the PUCCH through an indicator of a first CCE of CCEs on the PDCCH received through a primary component carrier. In addition, the user equipment may select any one of CCEs other than the first CCE among the CCE on the PDCCH received as described above and implicitly obtain an additional resource index ($n_{PUCCH,1}$) from an index of the selected CCE.

In addition, the user equipment may also explicitly obtain ARI ACK/NACK transmission resources transmitted on the PDCCH of a secondary component carrier.

The user equipment may configure a table for channel selection using the implicitly/explicitly obtained resources (S1030). The table for channel selection is, for example, a table in which resources to be used for transmission and symbols are mapped to each other according to the types of signals to be transmitted, for example, ACK/NACK signals.

The table for channel selection is changed according to an M value (the number of bits used to transmit the ACK/NACK signal), and the number of resource indices for configuring the table for channel selection is also changed according to the M value.

The table for channel selection may be configured by various methods. In the case in which two ACK/NACK resources are required in order to configure the table for channel selection, one ACK/NACK resource may be implicitly obtained, and another ACK/NACK resource may be explicitly obtained using the ARI, or the like.

The user equipment may map ACK/NACK signals to be transmitted to ACK/NACK resources to be used for transmission on the table for channel selection to allocate the ACK/NACK resources (S1040).

The user equipment transmits the ACK/NACK signal using the allocated ACK/NACK resources (S1050).

Although the exemplary embodiment of the present invention describes the case in which a single antenna is used to transmit the downlink HARQ ACK/NACK signal, the present invention is not limited thereto. That is, the present invention may also be applied to a case of multi-antenna transmission in which two or more antennas are used. In this case, the ACK/NACK resources may be allocated using the channel selection with respect to one antenna, and the ACK/NACK resources may be explicitly or implicitly allocated or the ACK/NACK resources different from the already allocated ACK/NACK resources may be allocated using the channel selection, with respect to another antenna.

Table 13 is a table for channel selection in the case in which M=2.

TABLE 13

| HARQ-ACK(0), HARQ-ACK(1) | $N^{(1)}_{PUCCH}$ | b(0), b(1) |
|---|---|---|
| ACK, ACK | $n^{(1)}_{PUCCH,1}$ | 1, 1 |
| ACK, NACK/DTX | $N^{(1)}_{PUCCH,0}$ | 0, 1 |
| NACK/DTX, ACK | $n^{(1)}_{PUCCH,1}$ | 0, 0 |
| NACK/DTX, NACK | $N^{(1)}_{PUCCH,1}$ | 1, 0 |
| NACK, DTX | $n^{(1)}_{PUCCH,0}$ | 1, 0 |
| DTX, DTX | N/A | N/A |

Table 14 is a table for channel selection in the case in which M=3.

TABLE 14

| HARQ-ACK(0), HARQ-ACK(1), HARQ-ACK(2) | $n^{(1)}_{PUCCH}$ | b(0), b(1) |
|---|---|---|
| ACK, ACK, ACK | $n^{(1)}_{PUCCH,2}$ | 1, 1 |
| ACK, ACK, NACK/DTX | $n^{(1)}_{PUCCH,1}$ | 1, 1 |
| ACK, NACK/DTX, ACK | $n^{(1)}_{PUCCH,0}$ | 1, 1 |
| ACK, NACK/DTX, NACK/DTX | $n^{(1)}_{PUCCH,0}$ | 0, 1 |
| NACK/DTX, ACK, ACK | $n^{(1)}_{PUCCH,2}$ | 1, 0 |
| NACK/DTX, ACK, NACK/DTX | $n^{(1)}_{PUCCH,1}$ | 0, 0 |
| NACK/DTX, NACK/DTX, ACK | $n^{(1)}_{PUCCH,2}$ | 0, 0 |
| DTX, DTX, NACK | $n^{(1)}_{PUCCH,2}$ | 0, 1 |
| DTX, NACK, NACK/DTX | $n^{(1)}_{PUCCH,1}$ | 1, 0 |
| NACK, NACK/DTX, NACK/DTX | $n^{(1)}_{PUCCH,0}$ | 1, 0 |
| DTX, DTX, DTX | N/A | N/A |

Table 15 is a table for channel selection in the case in which M=4.

TABLE 15

| HARQ-ACK(0), HARQ-ACK(1), HARQ-ACK(2), HARQ-ACK(3) | $n^{(1)}_{PUCCH}$ | b(0), b(1) |
|---|---|---|
| ACK, ACK, ACK, ACK | $n^{(1)}_{PUCCH,1}$ | 1, 1 |
| ACK, ACK, ACK, NACK/DTX | $n^{(1)}_{PUCCH,1}$ | 1, 0 |
| NACK/DTX, NACK/DTX, NACK, DTX | $n^{(1)}_{PUCCH,2}$ | 1, 1 |
| ACK, ACK, NACK/DTX, ACK | $n^{(1)}_{PUCCH,1}$ | 1, 0 |
| NACK, DTX, DTX, DTX | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 0, 1 |
| NACK/DTX, NACK/DTX, NACK/DTX, NACK | $n^{(1)}_{PUCCH,3}$ | 1, 1 |
| ACK, NACK/DTX, ACK, NACK/DTX | $n^{(1)}_{PUCCH,2}$ | 0, 1 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,3}$ | 0, 1 |
| NACK/DTX, NACK, DTX, DTX | $n^{(1)}_{PUCCH,1}$ | 0, 0 |
| NACK/DTX, ACK, ACK, NACK/DTX | $n^{(1)}_{PUCCH,2}$ | 1, 0 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| DTX, DTX, DTX, DTX | N/A | N/A |

In Tables 13 to 15, HARQ-ACK (0) to HARQ-ACK (3) indicate an ACK/NACK type for a codeword that is to be judged whether it has been normally received (decoded). $n^{(1)}_{PUCCH}$ indicates HARQ ACK/NACK resources to be used for transmission using the PUCCH formats 1a/1b. Here, each ACK/NACK resource configuring the table for channel selection, for example, $\{n^{(1)}_{PUCCH,0}, n^{(1)}_{PUCCH,1}\}$ in the case in which M=2, $\{n^{(1)}_{PUCCH,0}, n^{(1)}_{PUCCH,1}, n^{(1)}_{PUCCH,2}\}$ in the case in which M=3, and $\{n^{(1)}_{PUCCH,0}, n^{(1)}_{PUCCH,1}, n^{(1)}_{PUCCH,2}, n^{(1)}_{PUCCH,3}\}$ in the case in which M=4 indicate implicitly or explicitly allocated transmission resources as described above.

b(0), b(1) indicate QPSK symbols of ACK/NACK signals to be transmitted. Since the case in which a value of b(0), b(1) is mapped to N/A, that is, the case of discontinuous transmission (DTX) corresponds to a case in which the user equipment does not receive the PDCCH, or the like, the user equipment does not transmit an ACK/NACK response in a subframe n.

When the user equipment allocates the resource using the channel selection, it transmits a corresponding transmission symbol (b(0), b(1)) on the PUCCH using ACK/NACK transmission resource $n^{(1)}_{PUCCH}$ mapped according to ACK/NACK types corresponding to decoding results of the received PDSCHs. For example, in the case in which M=3, when all of the types of ACK/NACK signals to be transmitted are ACK, the user equipment transmits a value (1, 1) of a corresponding symbol (b(0), b(1)) on the PUCCH using an ACK/NACK resource $n^{(1)}_{PUCCH,1}$.

In the case of the PUCCH format 1b with the channel selection, resources having the number that is the same as that of bits of an HARQ ACK/NACK signal to be transmitted are required, and a HARQ ACK/NACK signal having up to maximum 4 bits may be transmitted.

The table for channel selection described above is only an example for describing the technical idea of the present invention and does not limit the present invention thereto. Therefore, it is to be noted that the table for channel selection may be configured in various schemes in the scope of the present invention.

Meanwhile, in the case in which a single carrier is used with respect to the uplink and downlink, a single $n_{CCE}$ is allocated to a single PDCCH. The user equipment receiving a single PDSCH indicated by the PDCCH may transmit an ACK/NACK signal for the PDSCH through PUCCH resources based on $n_{CCE}$.

Figure 11:
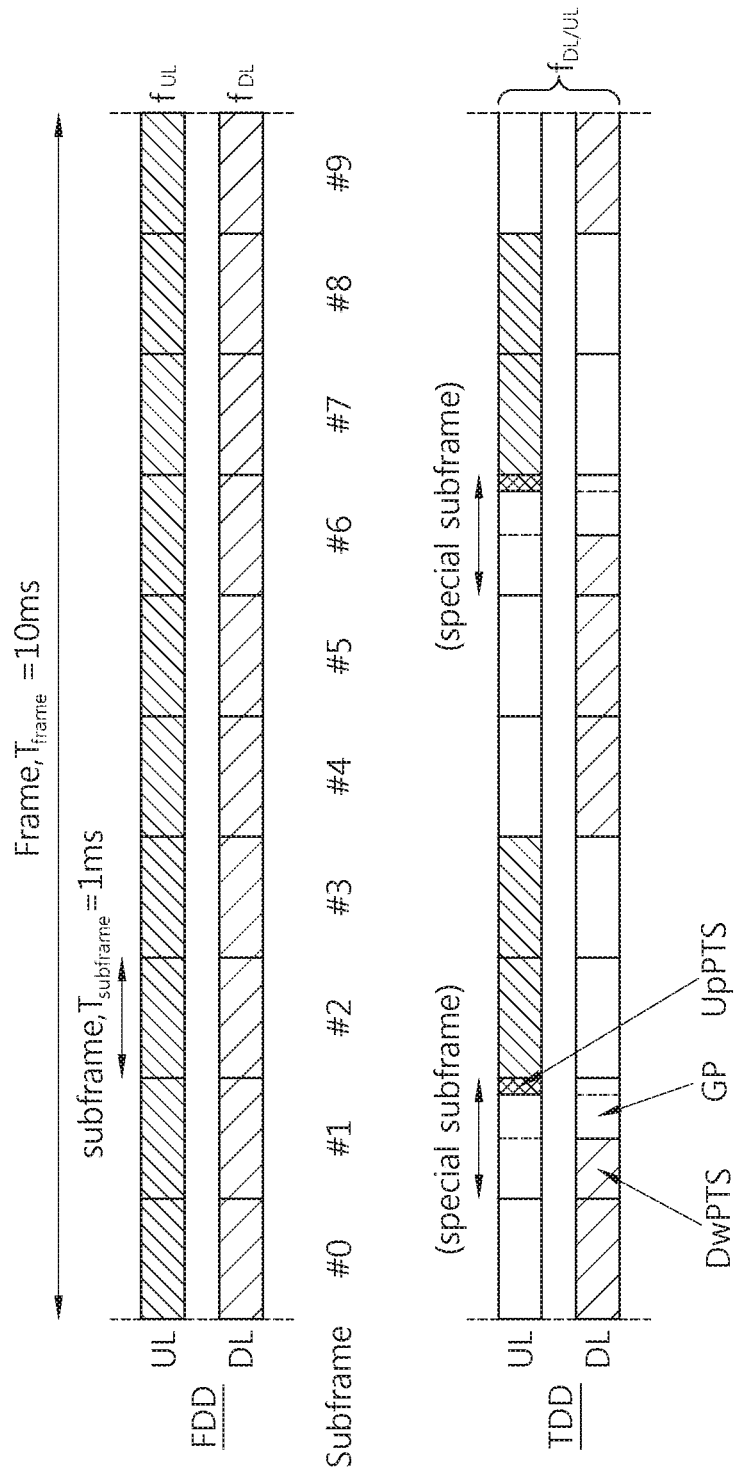
FIG. 11 schematically shows time and frequency structures of an uplink/downlink in frequency division duplex (FDD) and time division duplex (TDD) modes.

FIG. 11 schematically shows time and frequency structures of an uplink/downlink in frequency division duplex (FDD) and time division duplex (TDD) modes. The LTE supports both of the FDD and TDD as shown in FIG. 11. In the case of the FDD, a carrier used for uplink transmission and a carrier used for downlink transmission are separately present, such that the uplink transmission and the downlink transmission may be simultaneously performed within the cell.

In the case of the TDD, the uplink transmission and the downlink transmission are always temporally separated from each other based on a single cell. Since the same carrier is used for the uplink transmission and the downlink transmission, the base station and the user equipment are repeatedly switched between a transmission mode and a reception mode. In the case of the TDD, a special subframe is set, thereby making it possible to provide a guard time for the switching between the transmission and reception modes. The special subframe may be configured of a downlink portion DwPTS, a guard period GP, and an uplink portion UpPTS as shown in FIG. 11. Both of the uplink transmission and the downlink transmission are not performed during the guard period.

Table 16 shows configurations of the uplink and the downlink in the TDD mode.

TABLE 16

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

As shown in Table 16, the base station and the user equipment perform the uplink and downlink transmissions through seven possible uplink/downlink frame configurations. In a frame structure configured of ten subframes, 'D' indicates a downlink subframe, and 'U' indicates an uplink subframe. 'S' indicates the above-mentioned special subframe.

Through the downlink/uplink configuration, the transmission resources may be asymmetrically allocated to the uplink transmission and the downlink transmission. In addition, the downlink/uplink frame configuration used between the base station and the user equipment is not dynamically changed. For example, the base station and the user equipment that have performed the downlink and uplink transmissions in configuration 3 do not perform the downlink and uplink transmissions in configuration 4 in a frame unit. However, the configuration may be changed by RRC, or the like, according to a change in a network environment or a system.

Meanwhile, in the case of the FDD, the user equipment transmits a HARQ ACK/NACK for a PDSCH received in a subframe n−4 in a subframe n.

In the case of the TDD, the user equipment transmits a HARQ ACK/NACK for a PDSCH received in a subframe (subframes) n-k in an uplink subframe n. Here, k may be an element of K, and the K may be defined as represented by Table 17. The K may be determined by the uplink-downlink (UL-DL) configuration and the subframe n and be configured of M elements $\{k_0, k_1, \ldots, k_{M-1}\}$.

TABLE 17

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |

TABLE 17-continued

| UL-DL Configuration | \multicolumn{10}{c}{Subframe n} |
|---|---|---|---|---|---|---|---|---|---|---|
| | 0 | 1 | 2 | 3 | 4 | 5 | 6 | 7 | 8 | 9 |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In comparison with Table 16, it may be appreciated that subframes for which numerals are written in Table 17 are subframes performing the uplink transmission.

A relationship between uplink subframes and downlink subframes may be clearly confirmed through Table 17. A HARQ ACK/NACK signal for a downlink subframe may be transmitted through an uplink subframe to which the downlink subframe corresponds.

Referring to Table 17, in the case in which the uplink-downlink configuration is 0 and n is 2, k is 6. Therefore, a HARQ ACK/NACK for a PDSCH received in a subframe 6 of the previous frame is transmitted in the uplink in a subframe 2 of the next frame. In the case in which the uplink-downlink configuration is 4 and n is 3, K={6, 5, 4, 7}. Therefore, HARQ ACKs/NACKs for PDSCHs received in subframes 7, 8, 9, and 6 of the previous frame are transmitted in the uplink in a subframe 3 of the next frame.

Figure 17:
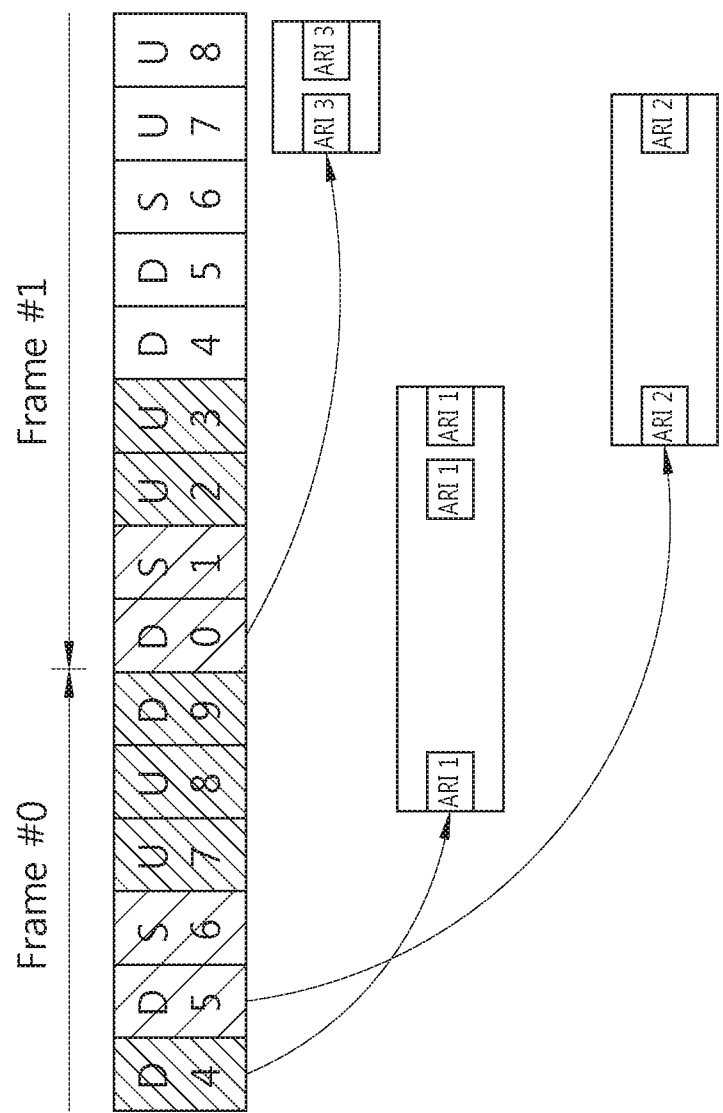
FIG. 17 schematically shows an example of setting an ARI window with respect to a downlink-uplink configuration 1 in a TDD system using a single carrier.

Even in the case of the TDD system using a single carrier, it may be confirmed from FIG. 17 that at least two downlink subframes correspond to a single uplink subframe in configurations other than configurations 0 and 6 among the uplink-downlink configurations. In this case, each of the TPCs is transmitted on the PDCCH in order to control power of the same uplink PUCCH in the downlink subframes corresponding to the same uplink subframe, which may act as an overhead of downlink control information. Therefore, even in the TDD system using a single carrier, when a plurality of TPCs for a single PUCCH are transmitted, it may be considered to transmit the ARI using bits allocated to an overlapped TPC field.

Therefore, even in the case of the TDD system using a single carrier, a method of configuring the table for channel selection using the implicitly obtained ACK/NACK resources or the explicitly obtained ACK/NACK resources through the ARI, the higher layer signaling, or the like, and transmitting the HARQ ACK/NACK signal using the table may be used.

For this, referring to Table 17, in the case in which HARQ ACK/NACK signals for a number of downlink subframes need to be transmitted in a single uplink subframe as in the uplink-downlink configuration 5, a number of transmission bits are required in order to transmit HARQ ACK/NACK symbols for individual downlink subframes. For example, when two codewords are transmitted per each downlink subframe, maximum 18 bits are required in order to transmit the HARQ ACK/NACK signals for each downlink subframe. Therefore, in the TDD system using a single carrier, when HARQ ACK/NACK signals for the uplink-downlink configuration 5 are transmitted using the PUCCH format 1b that may transmit maximum 4 bits, the ACK/NACK signals for each downlink subframe need to be bundled and transmitted.

A plurality of HARQ ACK/NACK signals may be bundled by various methods. For example, downlink component carriers or ACK/NACK signals for downlink subframes that are to be bundled may be bundled by a logical product operation. That is, in the case in which information on the downlink component carriers or the HARQ ACK/NACK signals for downlink subframes that are to be bundled is ACK, the ACK may be transmitted as a HARQ ACK/NACK signal representative of the bundled ACK/NACK signal. In the case in which information on at least one component carrier or the HARQ ACK/NACK signals for subframes is NACK, the NACK may be transmitted as the HARQ ACK/NACK signal representative of the bundled ACK/NACK signal. In addition, in the case in which information on at least one component carrier or the HARQ ACK/NACK signals for subframes is DTX, the DTX may be transmitted as the HARQ ACK/NACK signal representative of the bundled ACK/NACK signal.

In relation to this, a PUCCH format 3 other than the PUCCH formats of the 3GPP LTE shown in Table 1 has been additionally discussed. The PUCCH format 3 is a PUCCH format in which discrete Fourier transform—spreading—orthogonal frequency-division multiplexing (DFT-S-OFDM) is applied and uses DFT-IFFT and block spreading. When the HARQ ACK/NACK signal is transmitted using the PUCCH format 3, information up to maximum 10 bits in the case of the FDD and information up to maximum 20 bits in the case of the TDD may be transmitted as the HARQ ACK/NACK signal using the HARQ ACK/NACK resource. Therefore, in the TDD system using a single carrier, even in the case of the uplink-downlink configuration 5 of Table 17, the HARQ ACK/NACK signals may be multiplexed and transmitted without being bundled.

Figure 12:
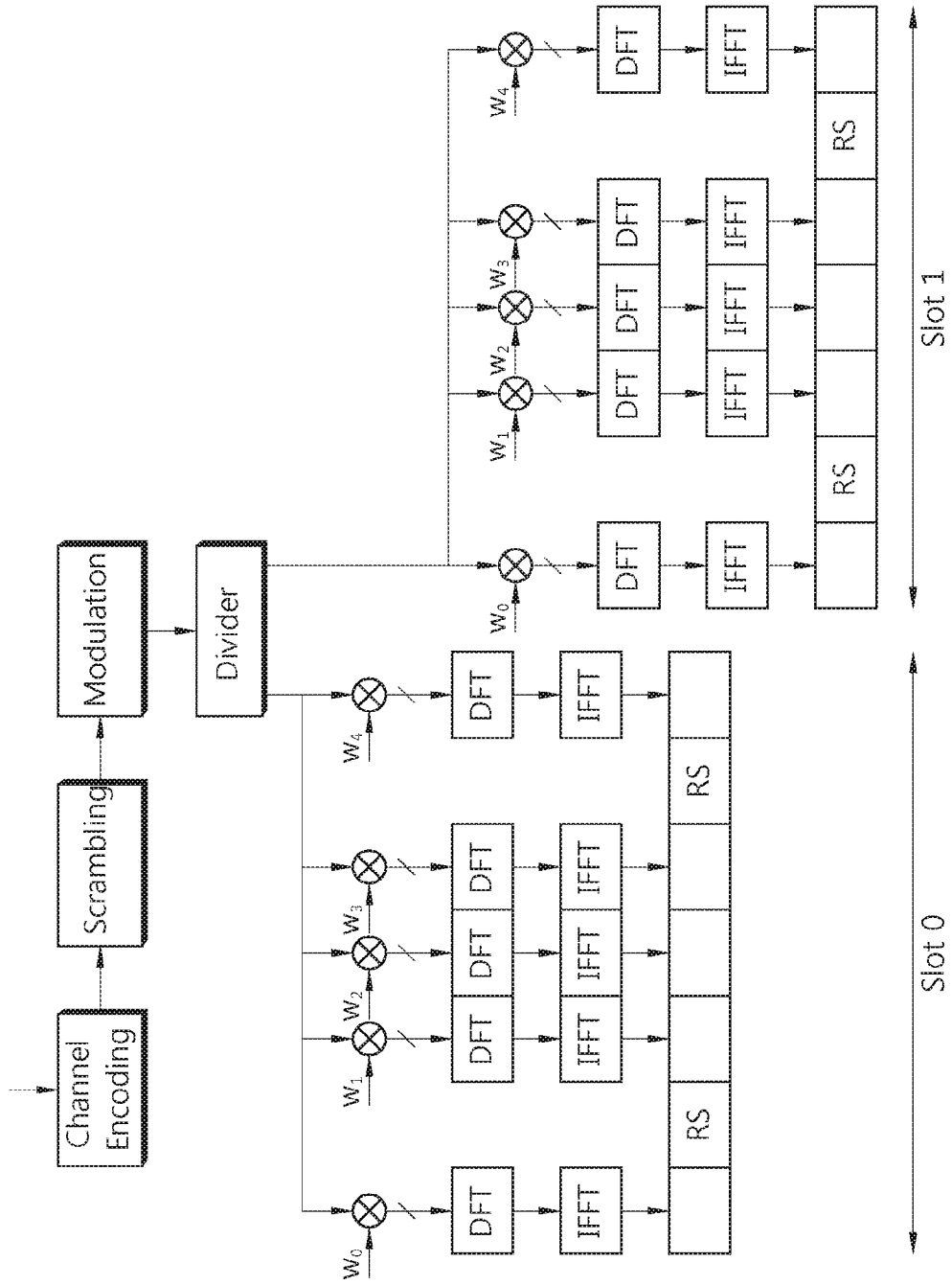
FIG. 12 schematically shows an example of a PUCCH format 3 in the case of a normal CP.

FIG. 12 schematically shows an example of a PUCCH format 3 in the case of a normal CP. In the normal CP, in the case of the PUCCH format 3, a single slot includes seven OFDM symbols, wherein two OFDM symbols of the seven symbols become RS OFDM symbols for a reference signal and five OFDM symbols thereof become data OFDM symbols for an uplink control signal, for example, an ACK/NACK signal. Here, the numbers of RS OFDM symbols and data OFDM symbols are only examples.

Channel encoding is first performed on information bits such as ACK/NACK, or the like, to be transmitted through a carrier. Various schemes of channel encodings may be applied. For example, any one of various kinds of coding schemes such as repetition, simplex coding, Reed-Muller (RM) coding, punctured RM coding, tail-biting convolutional coding (TBCC), low density parity check (LDPC) coding, turbo coding, or the like, may be used. Encoded information bits generated as a result of the channel coding may be rate-matched in consideration of a modulation symbol order to be applied and mapped resources.

The encoded information bits generated as a result of the channel coding may be subjected to cell-specific scrambling using a scrambling code corresponding to a cell ID and user equipment specific scrambling using a scrambling code corresponding to a user equipment ID such as a radio network temporary identifier (RNTI), in consideration of inter-cell interference (ICI).

Then, the encoded information bits are modulated by a modulator. The encoded information bits are modulated, such that a QPSK symbol may be generated. The modulated symbol is divided into first and second slots by a divider. The modulated symbol may be divided by various methods. An order of the modulator and the divider may also be changed.

The modulated symbol is temporally spread through an orthogonal code having an index of m determined in advance by radio resource control (RRC) signaling, or the like. The orthogonal code having the index of m may be represented by wm=[w0, w1, w2, w3, w4] in the case in which a spreading factor (SF) is 5 as shown in FIG. 10. As the orthogonal code, a Walsh code, a DFT code, or other orthogonal codes may be used. Here, the spreading factor means a factor of spreading data and may be changed according to a system. The spreading factor may be related to the number of multiplexed user equipments or antennas and a changed index may also be applied in a slot level.

The spread modulated symbol is discrete Fourier transform (DFT) pre-coded, is included in a subcarrier in a physical resource block (PRB), is transformed into a signal in a time domain by inverse fast Fourier transform (IFFT), has a CP attached thereto, and then is transmitted. Although the exemplary embodiment of the present invention describes an implementation of the PUCCH format 3, the PUCCH format 3 may be variously implemented and the present invention is not limited to a specific implementation of the PUCCH format 3.

In the system supporting the carrier aggregation (CA), a method of using the PUCCH format 3 may be variously considered. For example, it may be considered that a TPC field of a PDCCH corresponding to a PDSCH on the primary component carrier may be used as the TPC command, and a TPC field of a PDCCH corresponding to a PDSCH on the secondary component carrier may be diverted to the ARI.

However, in the case, in the TDD system using a single carrier, a method of transmitting the HARQ ACK/NACK signal using the PUCCH format 3 is problematic.

Here, the case of the TDD using a single carrier includes a case of a TDD system in which transmission is performed between the user equipment and the base station that may not support a carrier aggregation (CA) environment or a case of a TDD system in which the user equipment supports the CA environment but transmission is performed between the user equipment and the base station using a single carrier.

In the TDD system using a single carrier, when the HARQ ACK/NACK signals are transmitted using the PUCCH format 3, the HARQ ACK/NACK signals may be multiplexed and transmitted without being bundled even in the case of the uplink-downlink configuration 5 of Table 17. In the case in which two codewords are transmitted per downlink subframe, a payload size of maximum 18 bits may be required in order to multiplex and transmit HARQ ACK/NACK signals for a downlink subframe of the uplink-downlink configuration 5. In the case of the TDD system, since HARQ ACK/NACK signals having a maximum 20 bit length may be transmitted using the PUCCH format 3, when the PUCCH format 3 is used even in the case of the uplink-downlink configuration 5, the HARQ ACK/NACK signals may be multiplexed and transmitted. In the TDD system, in the case in which a payload size of the HARQ ACK/NACK signals exceeds a payload size of maximum 20 bits, the ACK/NACK signals may be transmitted through spatial bundling.

Hereinafter, in the TDD system using a single carrier according to the exemplary embodiment of the present invention, a method for allocating resources of a PUCCH format 3 in order to transmit HARQ ACK/NACK signals will be described.

<Fixed Allocation of Resources>

A method (fixed allocation) for explicitly allocating resources of the PUCCH format 3 through higher layer signaling such as RRC, or the like, may be considered. When the resources are allocated through the higher layer signaling such as the RRC, or the like, the resources used to transmit the HARQ ACK/NACK signals are fixed.

However, in this case, users other than users to which corresponding resources are allocated may not use the corresponding resources. Since the resources may not be flexibly used, an overhead of the resources may increase.

In addition, since the resource allocation may not be dynamically changed even though a channel state for fixedly allocated resources is not good, a case in which corresponding resources cannot but be continuously used may occur. Therefore, system performance may be deteriorated.

<Allocation of Resources Using Resource Indicator>

In the TDD system using a single carrier, a method for allocating resources of the PUCCH format 3 of an uplink subframe linked to a downlink subframe using a resource indicator, for example, an ACK/NACK resource indicator (ARI) in order to transmit HARQ ACK/NACK signals may be considered.

The base station may transmit the ARI by diverting bits to be allocated to the TPC field transmitted on the PDCCH of the downlink subframe linked to the uplink subframe. Hereinafter, unless particularly described, "diverting bits to be allocated to a TPC field" will be represented by "using the TPC field" in the present specification. In addition, hereinafter, unless particularly described, the ARI transmitted on the PDCCH of the downlink subframe is an ARI transmitted using the TPC field. For this, the user equipment may use resources indicated by the ARI as the resources of the PUCCH format 3 for transmitting the HARQ ACK/NACK signals in an uplink subframe corresponding to the downlink subframe in which a corresponding ARI is transmitted.

In the TDD system using a single carrier, the HARQ ACK/NACK signals may be transmitted using a single resource of the PUCCH format 3. Therefore, in this case, an ARI resource mapping table may be configured using the resources of the PUCCH format 3 and the ARI may be configured to indicate a single resource of the PUCCH format 3 on the ARI resource mapping table as in the above-mentioned case in which a single ACK/NACK transmission resource is required.

Case in which at Least Two Downlink Subframes Correspond to an Uplink Subframe

Here, the case in which at least two downlink subframes correspond to the uplink subframe means a case in which at least two of downlink subframes corresponding to the uplink subframe are scheduled. Therefore, in the description of the present invention, the uplink subframe and the downlink subframe mean scheduled subframes. As a case in which only one of downlink subframes corresponding to an uplink subframe is scheduled, a case in which a single downlink subframe corresponds to an uplink subframe to be described may be used.

A TPC field of the PDCCH transmitted in at least one of the downlink subframes corresponding to the uplink subframe is used as a TPC command. The ARI may be transmitted using a TPC field on the PUCCH transmitted in at least one of the other downlink subframes. The resources indicated by the ARI may be allocated as the ACK/NACK resources of the PUCCH format 3 for transmitting the HARQ ACK/NACK signals through the uplink subframe corresponding to the downlink subframe in which the ARI is transmitted.

Figure 13:
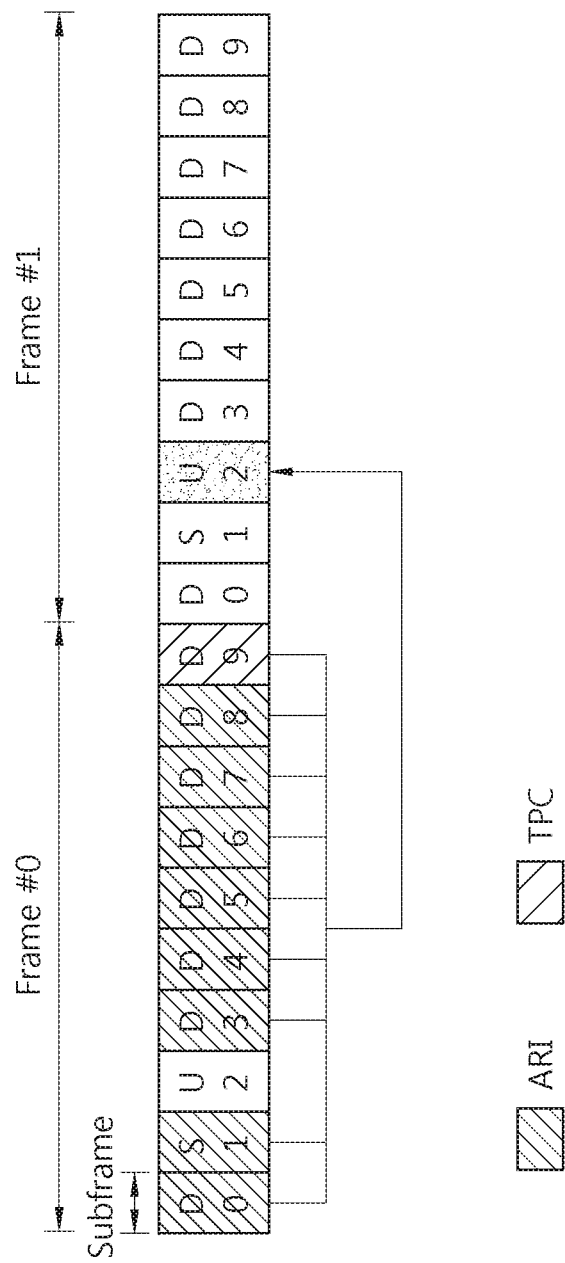
FIG. 13 shows a downlink-uplink configuration 5 in a TDD system using a single carrier.

FIG. 13 shows an uplink-downlink configuration 5 in a TDD system using a single carrier as an example for describing the present invention.

Referring to FIG. 13, downlink subframes (subframes 0 and 3 to 9) and a special subframe of a frame #0 correspond to an uplink subframe (a subframe 2) of a frame #1. Here, the TPC field on the PDCCH transmitted in any one of the downlink subframes of the frame #0 may be used as the TPC command for controlling power of a PUCCH transmitted in the subframe 2 of the frame #1. In addition, the base station may transmit the ARI using the TPC field of the PDCCH transmitted in the subframes other than the subframe in which the TPC command is transmitted among the downlink subframes of the frame #0.

Preferably, the TPC field transmitted in the downlink subframe closest to the corresponding uplink subframe may be used as the TPC command. The reason is that a channel state that is temporally closest to that of an uplink transmission time may be reflected therein. For example, in FIG. 13, the TPC field transmitted in the subframe 9 of the frame #0 may be used as the TPC command for the PUCCH of the subframe 2 of the frame #1. Here, the base station may transmit the ARI using the TPC field of the PDCCH transmitted in the subframes other than the subframe 9 among the downlink subframes of the frame #0. Here, all of values indicated by the ARI transmitted in the downlink subframes corresponding to a single uplink subframe may be set to the same value.

When the PDCCH of the downlink subframe in which the TPC command for the uplink subframe is transmitted is missed, the previously received TPC command may be reused or currently set transmission power of the PUCCH may be maintained in order to transmit the PUCCH of a corresponding uplink subframe. For example, when the previously received TPC command is a command indicating that transmission power is reduced by 1 dB, in the case in which the TPC command is lost during a transmission process, the user equipment may reduce the transmission power of the PUCCH by 1 dB by reusing the previous TPC command. In addition, the user equipment may maintain the currently set transmission power of the PUCCH as it is instead of reducing the transmission power of the PUCCH by 1 dB. When the PDCCH of the downlink subframe in which the TPC command for the uplink subframe is transmitted is missed, whether the previous TPC command is reused or the currently set transmission power of the PUCCH is maintained may be determined through the higher layer signaling such as the RRC, or the like, or be preset in the user equipment.

When the PDCCH of the downlink subframe in which the TPC command for the uplink subframe is transmitted is received but the PDCCH of the downlink subframe in which the ARI is transmitted is missed, the HARQ ACK/NACK signals may be transmitted using the resources of the PUCCH formats 1a/1b. For example, when the user equipment misses the ARI indicating the allocated resources, it may be implicitly allocated with the resources of the PUCCH formats 1a/1b to transmit the HARQ ACK/NACK signals.

Case in which a Single Downlink Subframe Corresponds to an Uplink Subframe

A case in which a single downlink subframe corresponds to an uplink subframe includes a case in which only a single downlink subframe is scheduled with respect to an uplink subframe corresponding to a plurality of downlink subframes as well as a case in which a corresponding uplink subframe is originally corresponding to a single downlink subframe as seen in the uplink-downlink configuration 0, 1, or 6 of Table 17.

The base station may transmit the ARI using the TPC field transmitted on the PDCCH of the downlink subframe corresponding to the uplink subframe. The user equipment may reuse the previously received TPC command or maintain the currently set transmission power of the PUCCH in order to transmit the PUCCH of a corresponding uplink subframe. Whether the previous TPC command is reused or the currently set transmission power of the PUCCH is maintained may be determined through the higher layer signaling such as the RRC, or the like, or be preset in the user equipment.

Figure 14:
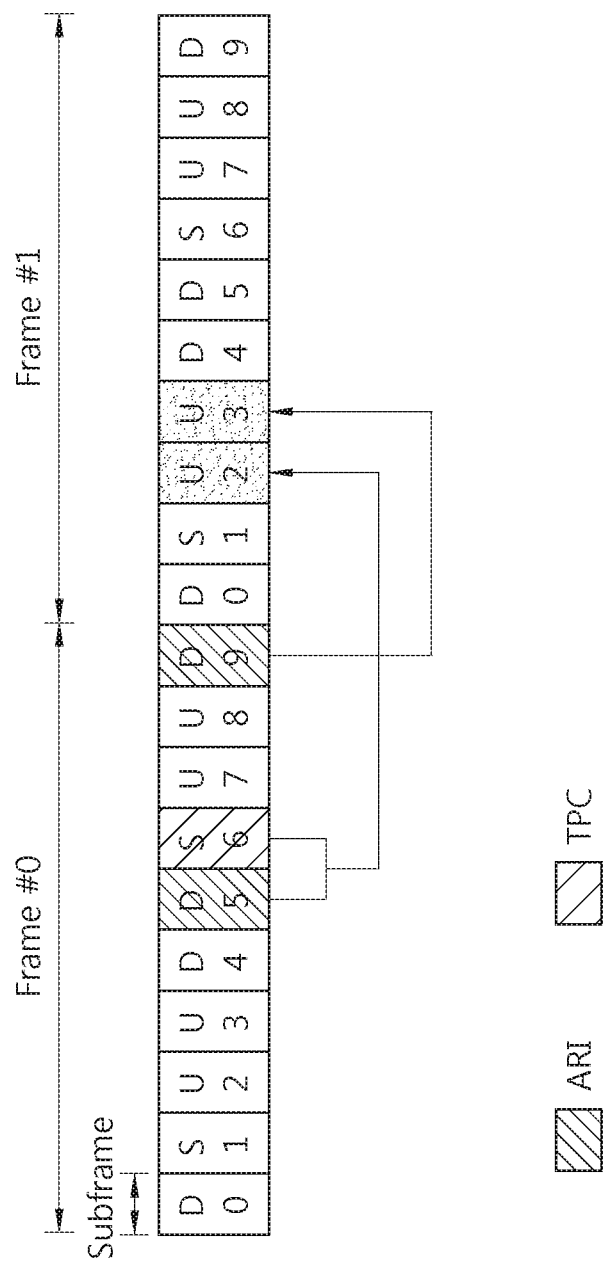
FIG. 14 shows a downlink-uplink configuration 1 in a TDD system using a single carrier.

FIG. 14 shows an uplink-downlink configuration 1 in a TDD system using a single carrier as an example for describing the present invention. Referring to FIG. 14, two downlink subframes of a frame #0 correspond to a subframe 2, which is an uplink subframe of a frame #1, and a single downlink subframe of the frame #0 corresponds to a subframe 3, which is an uplink subframe of the frame #1.

Here, with respect to a PUCCH transmitted in the subframe 2 of the frame #1, resources may be allocated according to the method for allocating resources of the PUCCH format 3 in the 'case in which at least two downlink subframes correspond to an uplink subframe' as described above.

With respect to the subframe 3 of the frame #1, the HARQ ACK/NACK signals may be transmitted on the PDCCH using the resources of the PUCCH format 3 indicated by the ARI transmitted using the TPC field on the PUCCH of a subframe 9 of the frame #0. Here, the user equipment may reuse the TPC command received on the PDCCH of a subframe 6 of the frame #0 in order to transmit the PUCCH of the subframe 3 of the frame #1. Alternatively, the user equipment may also maintain the transmission power used for transmitting the PUCCH in the subframe 2 of the frame #1 as it is in order to transmit the PUCCH of the subframe 3 of the frame #1. Which of two methods the user equipment uses in order to transmit the PUCCH of the subframe 3 of the frame #1 may be determined through the higher layer signaling such as the RRC, or the like, or be preset in the user equipment. Meanwhile, in the case in which the uplink subframe corresponds to a single downlink subframe, the TPC transmitted on the PDCCH of the downlink subframe may also be used of the TPC command according to a channel stator, a network system environment, or the like. In this case, the user equipment may be implicitly allocated with the resources of the PUCCH formats 1a/1b to transmit the HARQ ACK/NACK signals.

Fixing of Downlink Subframe Transmitting ARI

It is possible to transmit the ARI instead of the TPC command using the TPC field on the PDCCH of only a specific downlink subframe per each frame. For example, with respect to each uplink-downlink configuration of Table 17, the downlink subframes in which the ARI may be transmitted may be set in each frame. In this case, the user equipment may transmit the HARQ ACK/NACK signals using the resources of the PUCCH format 3 indicated by the received ARI until the ARI is transmitted in the next frame. Therefore, the resources of the PUCCH format 3 may be semi-dynamically allocated per each frame.

In this case, at least one subframe in which the ARI may be transmitted may be specified per each frame. That is, the downlink subframe in which the ARI may be transmitted may be specified by setting a period at which the ARI is transmitted to 5 ms, 10 ms, or the like, or setting an index of the subframe dedicated to ARI transmission to a subframe 1, a subframe 3, or the like, according to a channel environment, a load of a network system, or the like. Here, the setting of the transmission period of the setting of the dedicated subframe index may be performed through the RRC signaling or the like.

Figure 15:
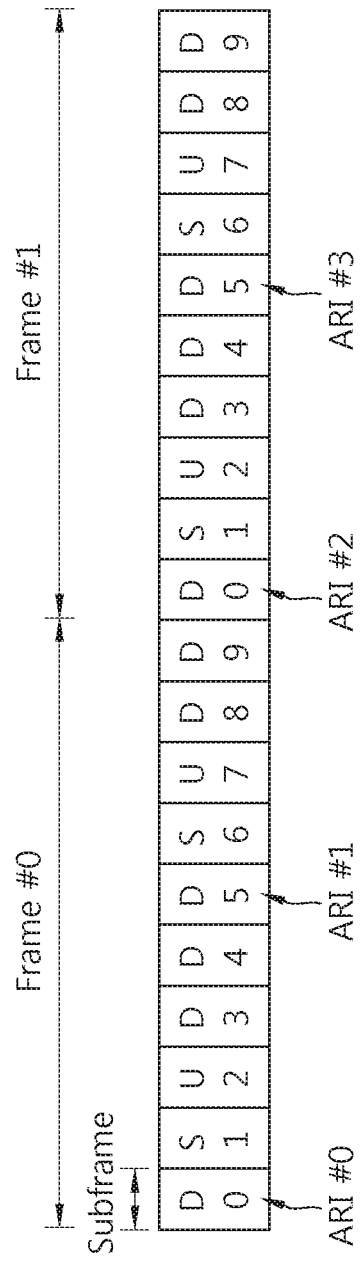
FIG. 15 schematically shows an example of specifying a downlink subframe transmitting an ARI with respect to a downlink-uplink configuration 2 in a TDD system using a single carrier.

FIG. 15 schematically shows an example of specifying a downlink subframe transmitting an ARI with respect to an uplink-downlink configuration 2 in a TDD system using a single carrier. Referring to FIG. 15, the ARI is transferred in a subframe 0 and a subframe 5 that are specified per each frame. In FIG. 15, the ARI may be regarded as being transmitted at a period of 5 ms.

Use of ARI Window

The resources of the PUCCH format 3 may be allocated by setting a window to which the ARI transmitted on the PDCCH of a specific downlink subframe is applied and using the same ARI with respect to the uplink subframes positioned in the window.

The ARI window in which the same ARI is applied may be set per ARI transmitted on the PDCCHs of the downlink subframes or be set only with respect to the ARI transmitted on the PDCCH of a specific downlink subframe.

In addition, the downlink subframe in which the ARI is transmitted may be specified, and a length of the ARI window in which the ARI transmitted in a corresponding downlink subframe is applied may be set according to a transmission interval or a transmission period of the ARI.

The transmission interval or the transmission period of the ARI and the length of the ARI window may be preset between the user equipment and the base station or be transferred to the user equipment through the RRC signaling.

Figure 16:
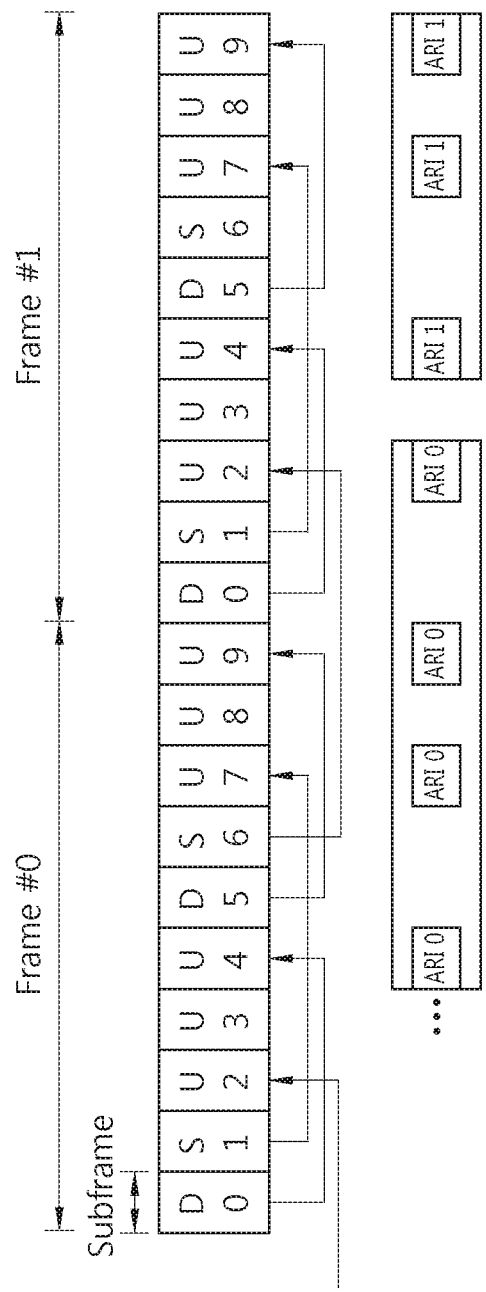
FIG. 16 schematically shows an example of setting an ARI window with respect to a downlink-uplink configuration 0 in a TDD system using a single carrier.

FIG. 16 schematically shows an example of setting an ARI window with respect to an uplink-downlink configuration 0 in a TDD system using a single carrier. Referring to an example shown in FIG. 16, the ARI is transmitted in a downlink subframe 0 corresponding to a subframe 4, which is an uplink subframe. The transmission period of the ARI is set to 10 ms. The uplink subframes except for the uplink subframe (subframes 3 and 8) in which the HARQ ACK/NACK for the downlink is not transmitted may transmit the HARQ ACK/NACK signal using the resources of the PUCCH format 3 indicated by the ARI of the ARI window to which they pertain.

FIG. 17 schematically shows an example of setting an ARI window with respect to an uplink-downlink configuration 1 in a TDD system using a single carrier.

The ARI window for the ARIs transmitted on the PDCCH of each downlink subframe may be set to be temporally overlapped with each other. In this case, a first applied ARI window may be specified with respect to the uplink subframes positioned at locations at which a plurality of ARI windows are overlapped with each other. For example, an ARI transmitted through a specific subframe may be set to be first applied or a temporally new ARI window may be first applied. A method of selecting the first applied ARI window may be preset between the user equipment and the base station or be transferred to the user equipment through the RRC signaling.

In the case in which the temporally new ARI window is first applied, the HARQ ACK/NACK signals may be transmitted using the resources of the PUCCH format 3 indicated by an ARI 2 in a subframe 3 of a frame #1 of FIG. 17.

Consideration of Uplink-Downlink Configuration—Resource Allocation Scheme

In consideration of each uplink-downlink configuration of Table 17, the resources of the PUCCH format 3 for transmitting the HARQ ACK/NACK signals may be allocated with respect to the uplink subframe.

For example, in the case of the uplink-downlink configurations 0 and 6, the downlink subframe and the uplink subframe correspond to each other on one-to-one basis. Therefore, in this case, it may be considered to allocate the resources of the PUCCH format 3 by methods different from other downlink-uplink configurations.

That is, in the case of the uplink-downlink configurations 0 and 6, since only a single downlink subframe corresponds to the uplink subframe, a method of using the TPC field transmitted on the PDCCH in the downlink subframe as the TPC command may be considered. In this case, the resources of the PUCCH format 3 for the HARQ ACK/NACK transmission may be allocated through the higher layer signaling. In addition, the user equipment may be implicitly allocated with the resources of the PUCCH formats 1a/1b to perform the HARQ ACK/NACK transmission.

Here, with respect to the uplink-downlink configurations 1 to 5, the HARQ ACK/NACK resources may be allocated through the above-mentioned various methods.

Consideration of Uplink-Downlink Configuration—Codebook Size

In the TDD system using a single carrier according to the exemplary embodiment of the present invention, a codebook size of the used PUCCH format 3 needs to be determined in order to accurately transmit and receive data between the user equipment and the base station.

For example, referring to Table 17, in the case of the uplink-downlink configuration 3, the HARQ ACK/NACK signal of maximum 6 bits may be transmitted in a single uplink subframe. That is, the HARQ ACK/NACK signal for subframes 1, 5, and 6 of the previous frame is transmitted in a subframe 2, which is the uplink subframe. Here, when two codewords are transmitted in each of the subframes 1, 5, and 6, which are the downlink subframes, the HARQ ACK/NACK signal of maximum 6 bits is transmitted.

However, even in this case, some of the subframes 1, 5, and 6, may be scheduled, and only a single codeword may be transmitted in the downlink subframe. In addition, the HARQ ACK/NACK signal for maximum 2 downlink subframes is transmitted in each of the subframes 3 and 4, which are the uplink subframes.

Therefore, the number of bits (a codebook size) used when the user equipment transmits the HARQ ACK/NACK signals using the PUCCH format 3 needs to be determined between the user equipment and the base station.

As described in the above example, the codebook size may be determined as the number of codewords transmitted in the downlink subframe in the uplink-downlink configuration, that is, the maximum number of bits of the HARQ ACK/NACK signal that may be transmitted through a single uplink subframe in the downlink transmission mode.

For example, in the case of the uplink-downlink configuration 3, when only two downlink subframes correspond to a subframe 2, which is the uplink frame, to be scheduled, an NACK signal is transmitted with respect to the downlink subframes that are not scheduled, thereby making it possible to fill the codebook size. In addition, in the case of transmitting the HARQ ACK/NACK signal in a subframe 3 in the uplink-downlink configuration 3, the NACK signal may be transmitted in order to fill the codebook size with respect to the number of bits of the PUCCH format 3 other than the HARQ ACK/NACK signal for two corresponding downlink subframes.

Therefore, the base station may always process bits having a determined size among signals transmitted on the PUCCH of the PUCCH format 3 as the HARQ ACK/NACK signal, according to the uplink-downlink configuration determined between the base station and the user equipment and the downlink transmission mode.

Figure 18:
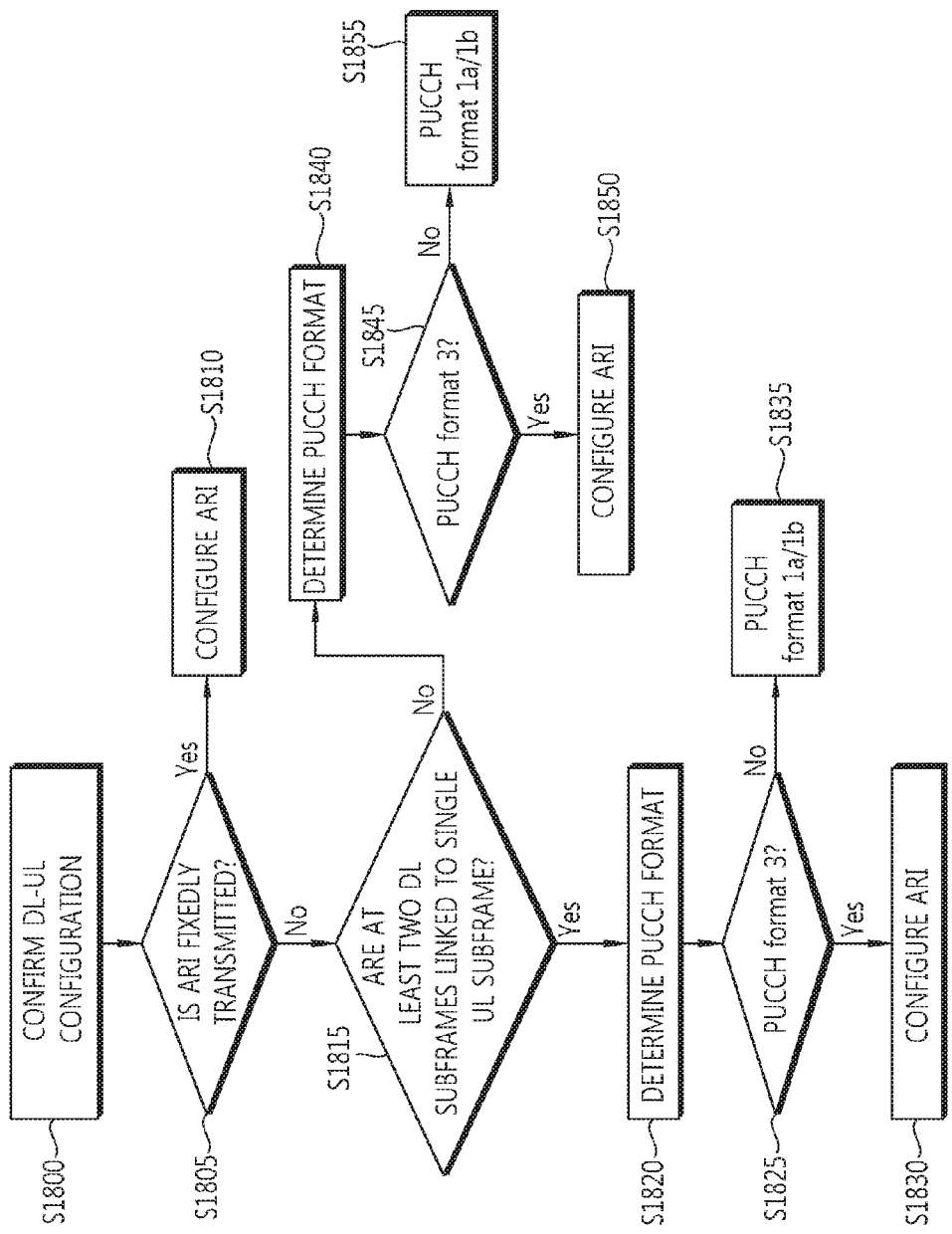
FIG. 18 is a flow chart schematically showing an example of a method for allocating HARQ ACK/NACK resources to be used by a user equipment in a base station of a TDD system using a single carrier.

FIG. 18 is a flow chart schematically showing an example of a method for allocating HARQ ACK/NACK resources to be used by a user equipment in a base station of a TDD system using a single carrier.

The base station first confirms a downlink-uplink configuration between the base station and the user equipment (S1800). The downlink-uplink configuration may be any one of seven downlink-uplink configurations of Table 17. The base station may recognize disposition of the downlink and uplink subframes and a relationship between the downlink and uplink subframes according to the downlink-uplink configuration. Once the downlink-uplink configuration between the base station and the user equipment is determined, it is not dynamically changed. Therefore, when transmission starts between the base station and the user equipment, the present operation needs not to be performed each time in order to allocate the HARQ ACK/NACK resources. That is, the base station may perform the present operation only in the case in which the downlink-uplink configuration is changed or it is judged that the downlink-uplink configuration needs to be changed.

The base station judges whether the ARI for allocating the HARQ ACK/NACK resources is fixedly transmitted (S1805). Whether the base station transmits the ARI through a specific subframe or at a specific period (fixed transmission) may be preset between the base station and the user equipment or be transferred to the RRC signaling, or the like.

When the ARI is fixedly transmitted, the base station configures the ARI indicating the resources of the PUCCH format 3 to be allocated in order to transmit the HARQ ACK/NACK signal (S1810). The configured ARI is transmitted to the user equipment through a predetermined specific subframe or at a determined period.

When the ARI is not fixedly transmitted, the base station judges whether at least two downlink subframes correspond to a single uplink subframe (S1815).

When it is judged that a downlink subframe to be transmitted is one of at least two downlink subframes corresponding to a single uplink subframe, a PUCCH format for the uplink subframe corresponding to the downlink subframe to be transmitted is determined (S1820).

It is judged whether it is determined that the PUCCH format 3 is used with respect to the uplink subframe (S1825). When it is determined that the PUCCH format 3 is used, the base station configures the ARI indicating the resources of the PUCCH format 3 to be allocated in order to transmit the HARQ ACK/NACK signal (S1830). When it is determined that the PUCCH format 3 is not used, the base station implicitly allocates the resources of the PUCCH formats 1a/1b (S1835).

Whether at least two downlink subframes correspond to a single uplink subframe is judged (S1815), and the PUCCH format for the uplink subframe is determined when it is judged that only a single downlink subframe corresponds to a single uplink subframe with respect to the downlink subframes to be transmitted (S1840).

It is judged whether it is determined that the PUCCH format 3 is used with respect to the uplink subframe (S1845). When it is determined that the PUCCH format 3 is used, the base station configures the ARI indicating the resources of the PUCCH format 3 to be allocated in order to transmit the HARQ ACK/NACK signal (S1850). When it is determined that the PUCCH format 3 is not used, the base station implicitly allocates the resources of the PUCCH formats 1a/1b (S1855).

FIG. 18 and a description of the present specification therefor provide an example of allocating the resources of the PUCCH format 3 or the resources of the PUCCH formats 1a/1b used to transmit the HARQ ACK/NACK signal using the TPC field transmitted on the PDCCH of the downlink subframe in the TDD system using a single carrier. Therefore, it is noted that the present invention is not limited thereto but may be variously applied within the scope of the present invention.

Figure 19:
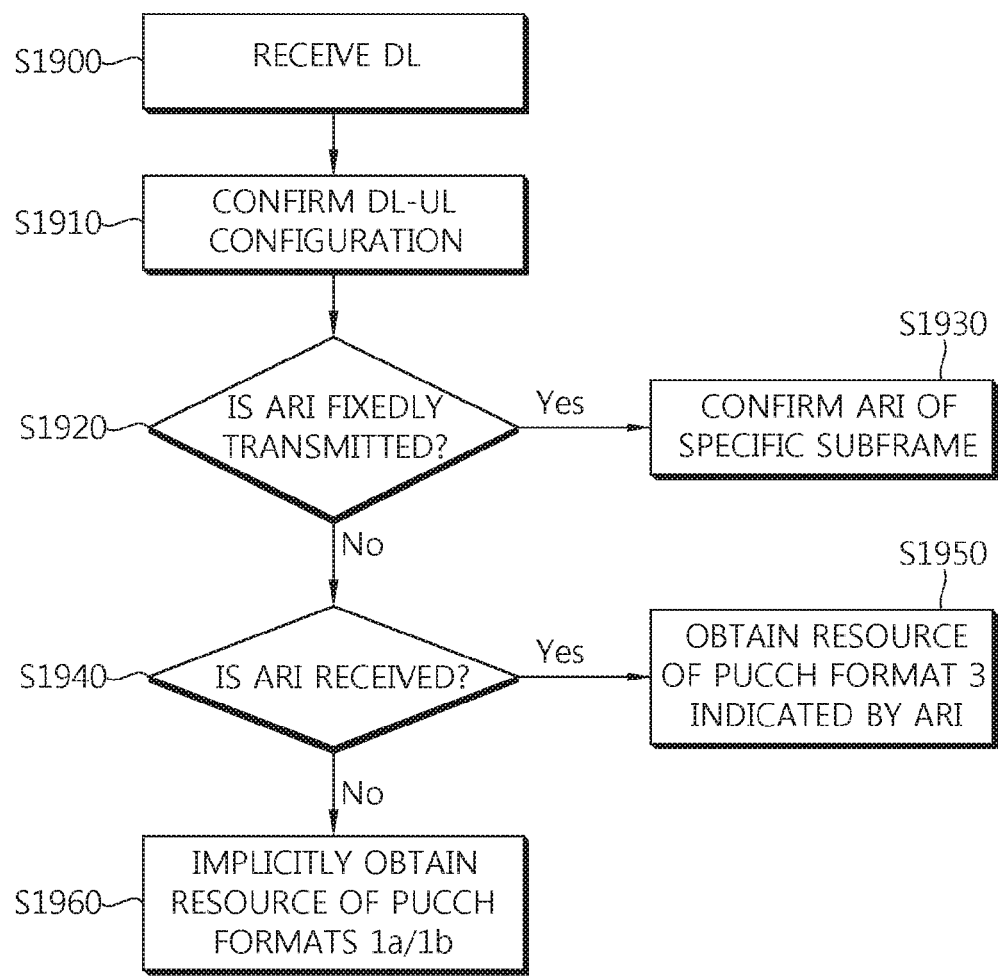
FIG. 19 is a flow chart schematically showing an example of a method for obtaining HARQ ACK/NACK resources in a user equipment of a TDD system using a single carrier.

FIG. 19 is a flow chart schematically showing an example of a method for obtaining HARQ ACK/NACK resources in a user equipment of a TDD system using a single carrier.

The user equipment receives the subframes (S1900).

The user equipment confirms a downlink-uplink configuration between the base station and the user equipment (S1910). The downlink-uplink configuration may be any one of seven downlink-uplink configurations of Table 17. The user equipment may recognize disposition of the downlink and uplink subframes and a relationship between the downlink and uplink subframes according to the downlink-uplink configuration. Once the downlink-uplink configuration between the base station and the user equipment is determined, it is not dynamically changed. Therefore, when transmission starts between the base station and the user equipment, the present operation needs not to be performed each time. That is, the user equipment may perform the present operation only in the case in which the user equipment is informed through the RRC signaling that the downlink-uplink configuration was changed.

The user equipment judges whether the ARI for allocating the HARQ ACK/NACK resources is fixedly transmitted (S1920). Whether the base station transmits the ARI through a specific subframe or at a specific period (fixed transmission) may be preset between the base station and the user equipment or be transferred to the RRC signaling, or the like.

When the ARI is fixedly transmitted, the user equipment confirms the ARI transmitted in the specific subframe in which the ARI is transmitted (S1930). The user equipment may transmit the HARQ ACK/NACK signal by obtaining the resources of the PUCCH format 3 indicated by the ARI.

When the ARI is not fixedly transmitted, the user equipment may receive the ARI through any one of the downlink subframes corresponding to the uplink subframe. Alternatively, when the number of downlink subframe corresponding to the uplink subframe is 1 or the subframe in which the ARI is transmitted among the downlink subframes corresponding to the uplink subframe is missed, the user equipment may obtain the HARQ ACK/NACK resources by methods other than the ARI. Therefore, the user equipment may judge whether the ARI was received (S1940). Whether the ARI is transmitted from the base station may be preset between the base station and the user equipment or be transferred to the RRC signaling, or the like.

The user equipment may obtain the resources of the PUCCH format 3 indicated by the ARI when the ARI is received (S1950). The user equipment may transmit the HARQ ACK/NACK signal in a corresponding uplink subframe using the obtained resources of the PUCCH format 3. The user equipment may implicitly obtain the resources of the PUCCH formats 1a/1b when the ARI is not transmitted from the base station or the transmitted ARI is missed (S1960). The user equipment may transmit the HARQ ACK/NACK signal in a corresponding uplink subframe using the obtained resources of the PUCCH formats 1a/1b.

FIG. 19 and a description of the present specification therefor provide an example of obtaining the resources of the PUCCH format 3 or the resources of the PUCCH formats 1a/1b used to transmit the HARQ ACK/NACK signal using the TPC field transmitted on the PDCCH of the downlink subframe in the TDD system using a single carrier. Therefore, it is noted that the present invention is not limited thereto but may be variously applied within the scope of the present invention.

FIG. 20 is a block diagram schematically showing an example of configurations of a base station and a user equipment in a system according to the exemplary embodiment of the present invention.

A user equipment 2000 may include a transceiving unit 2010, a storing unit 2020, a controlling unit 2030, and a resource determining unit 2040. A base station 2005 may include a transceiving unit 2015, a storing unit 2025, a controlling unit 2035, a PUCCH format determining unit 2045, and a resource allocating unit 2050.

The user equipment 2000 transceives required information through the transceiving unit 2010.

The storing unit 2020 stores the required information therein so that the user equipment 2000 may perform wireless communication on a network. For example, the storing unit 2020 may store information on downlink-uplink configurations that may be preset between the base station and the user equipment, an ARI resource mapping table, ARI transmission subframes, a priority between ARI windows, whether an ARI is transmitted or a TPC command is transmitted using a TPC field transmitted in a corresponding downlink subframe, or the like, and store control information transferred through RRC signaling, or the like.

The resource determining unit 2040 may determine resources to be used to transmit a HARQ ACK/NACK signal by obtaining resources of a PUCCH format 3 mapped by the received ARI on the ARI resource mapping table stored in the storing unit 2020 in the case in which the resources of the PUCCH format 3 are used in order to transmit the HARQ ACK/NACK signal. The resource determining unit 2040 may determine resources to be used to transmit a HARQ ACK/NACK signal by obtaining resources of PUCCH formats 1a/1b based on a first CCE of a PDCCH received on a downlink subframe in the case in which the resources of the PUCCH formats 1a/1b are used in order to transmit the HARQ ACK/NACK signal. In addition, the resource determining unit 2040 may determine resources to be used to transmit an ACK/NACK signal by obtaining allocated resources in the case in which resources are explicitly allocated through the RRC signaling, or the like.

The controlling unit 2030 of the user equipment 2000 may be connected to the transceiving unit 2010, the storing unit 2020, and the resource determining unit 2040 to control them. The controlling unit 2030 may transmit the HARQ ACK/NACK signal to the base station through the transceiving unit 2010 in an uplink subframe in which the resources are allocated using the resources determined by the resource determining unit 2040.

The base station 2005 may transceive required information through the transceiving unit 2015.

The storing unit 2025 stores the required information therein so that the base station 2005 may perform the wireless communication on the network. For example, the storing unit 2025 may store the information on the downlink-uplink configurations that may be preset between the base station and the user equipment, the ARI resource mapping table, the ARI transmission subframes, the priority between the ARI windows, whether the ARI is transmitted or the TPC command is transmitted in the TPC field transmitted in a corresponding downlink subframe, or the like, and store the control information transferred through the RRC signaling, or the like.

The PUCCH format determining unit 2045 may determine whether the PUCCH formats 1a/1b are used or the PUCCH format 3 is used with respect to an uplink subframe corresponding to transmitted downlink subframes.

The PUCCH resource allocating unit 2050 may allocate the resources used to transmit the HARQ ACK/NACK signal on the PUCCH according to the PUCCH format determined by the PUCCH format determining unit 2045. When the PUCCH format determining unit 2045 determines that the PUCCH format 3 is used, the PUCCH resource allocating unit 2050 may configure an ARI used to allocate the resources of the PUCCH format 3.

The controlling unit 2035 may be connected to the transceiving unit 2015, the storing unit 2025, the PUCCH format determining unit 2045, and the resource allocating unit 2050 to control them. The controlling unit 2035 may transmit information on the allocation of the HARQACK/NACK resources such as the ARI to the user equipment through the transceiving unit 2015. The controlling unit 2035 may allow the ARI to be transmitted using the TPC field transmitted on the PDCCH of the downlink subframe. In addition, the controlling unit 2035 may transmit the RRC signaling corresponding to the resource allocation to the user equipment through the transceiving unit 2015.

According to the exemplary embodiment of the present invention, it is possible to effectively allocate transmission resources for transmitting an ACK/NACK signal for a single carrier in a time division duplex (TDD) single carrier system.

According to the exemplary embodiment of the present invention, it is possible to effectively use wireless resources by diverting resources allocated to a duplicately transferred control signal in a TDD single carrier system.

In the above-mentioned exemplary system, although the methods have described based on a flow chart as a series of steps or blocks, the present invention is not limited to a sequence of steps but any step may be generated in a different sequence or simultaneously from or with other steps as described above. Further, it may be appreciated by those skilled in the art that steps shown in a flow chart is non-exclusive and therefore, include other steps or deletes one or more steps of a flow chart without having an effect on the scope of the present invention.

The above-mentioned embodiments include examples of various aspects. Although all possible combinations showing various aspects are not described, it may be appreciated by those skilled in the art that other combinations may be made. Therefore, the present invention should be construed as including all other substitutions, alterations and is modifications belong to the following claims.

What is claimed is:
1. A transmitting method comprising:
setting a first transmit power control (TPC) command associated with controlling of transmission power of physical uplink control channel (PUCCH) to be transmitted in an uplink subframe and a second TPC command which indicates resources for the PUCCH to be transmitted in the uplink (UL) subframe;
transmitting first physical downlink control channel (PDCCH) and first physical downlink shared channel (PDSCH) in a first downlink (DL) subframe, the first PDCCH including the first TPC command; and transmitting second PDCCH and second PDSCH in a second downlink (DL) subframe, the second PDCCH including the second TPC command, wherein the transmission of the first and second PDSCHs and a reception of the PUCCH are performed on a single carrier.

2. The method of claim 1, wherein the first and the second DL subframes associated with the UL subframe.

3. The method of claim 1, wherein the second TPC command indicates a resource to be used for the PUCCH among allocated resources by a higher layer signaling.

4. The method of claim 1, wherein the second TPC command is configured to indicate resources for the PUCCH in format 3.

5. A receiving method comprising:

receiving first physical downlink control channel (PDCCH) and first physical downlink shared channel (PDSCH) in a first downlink (DL) subframe, the first PDCCH including a first transmit power control (TPC) command associated with controlling of transmission power of physical uplink control channel (PUCCH); and receiving second PDCCH and second PDSCH in a second downlink (DL) subframe, the second PDCCH including a second TPC command which indicates resources for the PUCCH in an uplink (UL) subframe, wherein the reception of the first and second PDSCHs and a transmission of the PUCCH are performed on a single carrier, and wherein the first and the second DL subframes are associated with the UL subframe.

6. The method of claim 5, wherein the second TPC command indicates a resource to be used for the PUCCH among allocated resources by a higher layer signaling.

7. The method of claim 5, wherein the second TPC command is configured to indicate resources for the PUCCH in format 3.

8. A user equipment (UE) comprising:

a transceiver to receive first physical downlink control channel (PDCCH) and first physical downlink shared channel (PDSCH) in a first downlink (DL) subframe, the first PDCCH including a first transmit power control (TPC) command associated with controlling of transmission power of physical uplink control channel (PUCCH), and to receive second PDCCH and second PDSCH in a second DL subframe, the second PDCCH including a second TPC command which indicates resources for the PUCCH in an uplink (UL) subframe;

a resource determining unit to determine resources used to transmit the PUCCH in the UL subframe; and a controller to control a transmission of the PUCCH in the UL subframe, wherein the reception of the first and second PDSCHs and the transmission of the PUCCH in the UL subframe are performed on a single carrier, and wherein the first and the second DL subframes are associated with the UL subframe.

9. The UE of claim 8, wherein the second TPC command indicates a resource to be used for the PUCCH among allocated resources by a higher layer signaling.

10. The UE of claim 8, wherein the second TPC command is configured to indicate resources for the PUCCH in format 3.

* * * * *